US010924271B2

(12) United States Patent
Darnell et al.

(10) Patent No.: US 10,924,271 B2
(45) Date of Patent: *Feb. 16, 2021

(54) VEHICLE ACCESS SYSTEMS AND METHODS

(71) Applicant: Silvercar, Inc., Austin, TX (US)

(72) Inventors: Allen Darnell, Austin, TX (US); Matt McMillan, Round Rock, TX (US)

(73) Assignee: SILVERCAR, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,334

(22) Filed: Feb. 20, 2019

(65) Prior Publication Data
US 2020/0021436 A1  Jan. 16, 2020

Related U.S. Application Data

(63) Continuation of application No. 15/083,395, filed on Mar. 29, 2016, now Pat. No. 10,277,597.
(Continued)

(51) Int. Cl.
*G07C 9/00* (2020.01)
*H04L 9/32* (2006.01)
(Continued)

(52) U.S. Cl.
CPC ........... *H04L 9/0866* (2013.01); *G06Q 10/02* (2013.01); *G06Q 50/30* (2013.01); *G07B 15/00* (2013.01);
(Continued)

(58) Field of Classification Search
CPC ..... H04L 63/10; H04L 9/3234; H04L 9/3297; H04L 12/40; H04L 63/061;
(Continued)

(56) References Cited

U.S. PATENT DOCUMENTS

| 5,682,142 A | 10/1997 | Loosmore et al. |
| 6,038,666 A * | 3/2000 | Hsu ..................... G07C 9/00087 380/285 |

(Continued)

FOREIGN PATENT DOCUMENTS

| EP | 2743868 | 6/2014 |
| WO | WO 2014/146196 | 9/2014 |

OTHER PUBLICATIONS

International Preliminary Report on Patentability issued in International Application No. PCT/US16/60972, dated Feb. 8, 2018.
(Continued)

*Primary Examiner* — Edwin C Holloway, III
(74) *Attorney, Agent, or Firm* — Norton Rose Fulbright US LLP

(57) ABSTRACT

Systems, devices, and methods for controlling access to vehicles in rental, loaner, shared-use, and other vehicle fleets. Some of the present systems, devices, and methods use encrypted virtual keys that can be relayed to a vehicle computing device via a user's mobile device. Such virtual keys can be command-specific such that successful use of a virtual key results execution of a predetermined command or group of commands, and further commands require one or more additional virtual keys with the additional commands. Others of the present systems, devices, and methods provide tools: for provisioning or initial pairing of vehicle computing devices with corresponding vehicles, identifying and permitting a user to select locally available vehicles, prompting vehicle computing devices to retrieve pending commands from a server, and/or various other functions described in this disclosure.

20 Claims, 15 Drawing Sheets

Related U.S. Application Data

(60) Provisional application No. 62/252,778, filed on Nov. 9, 2015.

(51) Int. Cl.
| | |
|---|---|
| *H04L 9/08* | (2006.01) |
| *H04L 29/08* | (2006.01) |
| *H04W 4/029* | (2018.01) |
| *H04W 4/44* | (2018.01) |
| *H04L 12/40* | (2006.01) |
| *H04L 29/06* | (2006.01) |
| *G07C 9/38* | (2020.01) |
| *H04W 12/04* | (2021.01) |
| *H04W 12/08* | (2021.01) |
| *G06Q 10/02* | (2012.01) |
| *G07B 15/00* | (2011.01) |
| *G07C 5/00* | (2006.01) |
| *G06Q 50/30* | (2012.01) |
| *H04W 4/40* | (2018.01) |

(52) U.S. Cl.
CPC .............. *G07C 5/008* (2013.01); *G07C 9/38* (2020.01); *H04L 9/3234* (2013.01); *H04L 9/3297* (2013.01); *H04L 12/40* (2013.01); *H04L 63/061* (2013.01); *H04L 63/0876* (2013.01); *H04L 63/10* (2013.01); *H04L 67/12* (2013.01); *H04W 4/029* (2018.02); *H04W 4/40* (2018.02); *H04W 4/44* (2018.02); *H04W 12/0401* (2019.01); *H04W 12/0804* (2019.01); *G06Q 2220/00* (2013.01); *H04L 2012/40215* (2013.01); *H04L 2012/40273* (2013.01); *H04L 2209/84* (2013.01); *H04W 12/04* (2013.01); *H04W 12/08* (2013.01)

(58) Field of Classification Search
CPC ............... H04L 63/0876; H04L 67/12; H04L 2012/40215; H04L 9/0866; H04L 2012/40273; H04L 2209/84; G06Q 10/02; G06Q 50/30; G06Q 2220/00; G07B 15/00; G07C 5/008; G07C 9/00166; G07C 9/38; H04W 4/44; H04W 4/029; H04W 4/40; H04W 12/04; H04W 12/08; H04W 12/0401; H04W 12/0804
USPC ........................................................ 340/5.72
See application file for complete search history.

(56) References Cited

U.S. PATENT DOCUMENTS

| | | | |
|---|---|---|---|
| 6,356,838 B1 | 3/2002 | Paul | |
| 6,452,684 B1 | 9/2002 | Mennink | |
| 6,700,506 B1 | 3/2004 | Winkler et al. | |
| 6,862,500 B2 | 3/2005 | Tzamaloukas | |
| 6,925,378 B2 | 8/2005 | Tzamaloukas | |
| 7,076,365 B2 | 7/2006 | Tzamaloukas | |
| 7,188,026 B2 | 3/2007 | Tzamaloukas | |
| 7,233,227 B2 | 6/2007 | Lemoult | |
| 7,275,038 B1 | 9/2007 | Weinstock et al. | |
| 7,394,403 B2 | 7/2008 | Winkler et al. | |
| 7,656,271 B2 | 2/2010 | Ehrman et al. | |
| 7,794,239 B2 | 9/2010 | An | |
| 7,801,675 B2 | 9/2010 | Currie et al. | |
| 7,837,112 B2 | 11/2010 | An | |
| 7,899,609 B2 | 3/2011 | Rodrigues et al. | |
| 7,911,881 B2 | 3/2011 | Di Federico | |
| 7,957,893 B2 | 6/2011 | Smartt | |
| 8,112,522 B2 | 2/2012 | Rogers et al. | |
| 8,120,467 B2 | 2/2012 | Ehrman et al. | |
| 8,139,820 B2 | 3/2012 | Plante et al. | |
| 8,140,477 B2 | 3/2012 | Moore, Jr. et al. | |
| 8,164,892 B2 | 4/2012 | An | |
| 8,239,092 B2 | 8/2012 | Plante et al. | |
| 8,271,190 B2 | 9/2012 | Smartt | |
| 8,306,777 B2 | 11/2012 | Smartt et al. | |
| 8,339,990 B1 | 12/2012 | Tzamaloukas | |
| 8,340,989 B2 | 12/2012 | Weinstock et al. | |
| 8,370,268 B2 | 2/2013 | Ehrman et al. | |
| 8,374,746 B2 | 2/2013 | Plante | |
| 8,374,894 B2 | 2/2013 | Weinstock et al. | |
| 8,401,881 B2 | 3/2013 | Weinstock et al. | |
| 8,433,505 B2 | 4/2013 | Rogers | |
| 8,532,920 B2 | 9/2013 | Coleman et al. | |
| 8,600,783 B2 | 12/2013 | Smith et al. | |
| 8,606,516 B2 | 12/2013 | Vertelney et al. | |
| 8,612,437 B2 | 12/2013 | Tzamaloukas et al. | |
| 8,649,933 B2 | 2/2014 | Plante et al. | |
| 8,653,944 B2 | 2/2014 | Lee et al. | |
| 8,660,794 B2 | 2/2014 | Currie et al. | |
| 8,693,458 B2 | 4/2014 | Smartt et al. | |
| 8,719,155 B2 | 5/2014 | Maney | |
| 8,737,052 B2 | 5/2014 | Cho et al. | |
| 8,768,565 B2 | 7/2014 | Jefferies et al. | |
| 8,781,708 B2 | 7/2014 | Wurts et al. | |
| 8,814,049 B2 | 8/2014 | Lee et al. | |
| 8,841,987 B1 | 9/2014 | Stanfield et al. | |
| 8,868,288 B2 | 10/2014 | Plante et al. | |
| 8,868,289 B2 | 10/2014 | Miljkovic et al. | |
| 8,880,239 B2 | 11/2014 | Kleve et al. | |
| 8,884,738 B2 | 11/2014 | Spangenberg et al. | |
| 8,892,310 B1 | 11/2014 | Palmer et al. | |
| 8,908,516 B2 | 12/2014 | Tzamaloukas | |
| 8,912,883 B2 | 12/2014 | Kobres | |
| 8,924,142 B2 | 12/2014 | Fink et al. | |
| 8,965,695 B2 | 2/2015 | Tzamaloukas | |
| 8,989,959 B2 | 3/2015 | Plante et al. | |
| 8,996,240 B2 | 3/2015 | Plante | |
| 9,037,405 B2 | 5/2015 | Gourlay et al. | |
| 9,066,206 B2 | 6/2015 | Lin et al. | |
| 9,129,336 B2 | 9/2015 | Ehrman | |
| 9,159,096 B2 | 10/2015 | Maney | |
| 9,166,977 B2 | 10/2015 | Desai et al. | |
| 9,183,679 B2 | 11/2015 | Plante et al. | |
| 9,201,842 B2 | 12/2015 | Plante | |
| 9,208,129 B2 | 12/2015 | Plante | |
| 9,245,040 B2 | 1/2016 | Currie et al. | |
| 9,261,366 B2 | 2/2016 | Coleman et al. | |
| 9,275,010 B2 | 3/2016 | Kote et al. | |
| 9,305,310 B2 | 4/2016 | Radhakrishnan et al. | |
| 9,313,163 B2 | 4/2016 | Salonen | |
| 9,365,188 B1 | 6/2016 | Penilla et al. | |
| 9,423,369 B2 | 8/2016 | Fargo et al. | |
| 9,442,888 B2 | 9/2016 | Stanfield et al. | |
| 9,466,155 B2 | 10/2016 | Miljkovic et al. | |
| 9,471,795 B2 | 10/2016 | Jayaraman et al. | |
| 9,518,833 B2 | 12/2016 | Fink | |
| 9,518,835 B2 | 12/2016 | Vertelney et al. | |
| 9,554,080 B2 | 1/2017 | Plante et al. | |
| 9,633,318 B2 | 4/2017 | Plante | |
| 9,671,233 B2 | 6/2017 | Holden et al. | |
| 9,701,281 B2 | 7/2017 | Reiser | |
| 9,818,151 B2 | 11/2017 | Ehrman | |
| 10,277,597 B2 * | 4/2019 | Darnell | ............... H04L 67/12 |
| 2002/0022979 A1 | 2/2002 | Whipp et al. | |
| 2002/0049663 A1 | 4/2002 | Kahana | |
| 2003/0034873 A1 | 2/2003 | Chase et al. | |
| 2004/0034772 A1 | 2/2004 | Alao | |
| 2004/0039612 A1 | 2/2004 | Fitzgerald et al. | |
| 2004/0073361 A1 | 4/2004 | Tzamaloukas et al. | |
| 2007/0132773 A1 | 6/2007 | Plante | |
| 2007/0135979 A1 | 6/2007 | Plante | |
| 2007/0135980 A1 | 6/2007 | Plante | |
| 2007/0136078 A1 | 6/2007 | Plante | |
| 2007/0150138 A1 | 6/2007 | Plante | |
| 2007/0260496 A1 | 11/2007 | Weinstock et al. | |
| 2007/0261653 A1 | 11/2007 | Yagyu | |
| 2008/0059424 A1 | 3/2008 | Tzamaloukas et al. | |
| 2008/0122626 A1 | 5/2008 | Ehrman et al. | |
| 2008/0140265 A1 | 6/2008 | Hong et al. | |
| 2008/0228533 A1 | 9/2008 | McGuire et al. | |

(56) References Cited

U.S. PATENT DOCUMENTS

| | | |
|---|---|---|
| 2009/0018717 A1 | 1/2009 | Reed et al. |
| 2009/0099897 A1 | 4/2009 | Ehrman et al. |
| 2009/0119657 A1* | 5/2009 | Link, II ................ G06F 8/64 717/171 |
| 2009/0256677 A1 | 10/2009 | Hein et al. |
| 2009/0291709 A1 | 11/2009 | Lee et al. |
| 2009/0312053 A1 | 12/2009 | An |
| 2010/0065642 A1 | 3/2010 | An |
| 2010/0114616 A1 | 5/2010 | Touati |
| 2010/0241352 A1 | 9/2010 | Tzamaloukas et al. |
| 2010/0321165 A1 | 12/2010 | Lee |
| 2011/0060480 A1 | 3/2011 | Mottla et al. |
| 2011/0060850 A1 | 3/2011 | Ko et al. |
| 2011/0112969 A1 | 5/2011 | Zaid et al. |
| 2011/0213629 A1 | 9/2011 | Clark et al. |
| 2011/0288891 A1 | 11/2011 | Zaid et al. |
| 2011/0301985 A1 | 12/2011 | Camp et al. |
| 2011/0313804 A1 | 12/2011 | Camp et al. |
| 2011/0313937 A1 | 12/2011 | Moore et al. |
| 2012/0016574 A1 | 1/2012 | Smartt |
| 2012/0092129 A1 | 4/2012 | Lickfelt |
| 2012/0159152 A1 | 6/2012 | Ha et al. |
| 2012/0210383 A1 | 8/2012 | Sayers et al. |
| 2012/0246036 A1 | 9/2012 | Man et al. |
| 2012/0280783 A1* | 11/2012 | Gerhardt ............ G07C 9/00309 340/5.6 |
| 2012/0323642 A1 | 12/2012 | Camp et al. |
| 2013/0042112 A1 | 2/2013 | Spector |
| 2013/0129951 A1 | 5/2013 | Hasty et al. |
| 2013/0132140 A1 | 5/2013 | Amin et al. |
| 2013/0132246 A1 | 5/2013 | Amin et al. |
| 2013/0132887 A1 | 5/2013 | Amin et al. |
| 2013/0179005 A1 | 7/2013 | Nishimoto et al. |
| 2013/0226633 A1 | 8/2013 | Brock et al. |
| 2013/0246102 A1 | 9/2013 | Finegold et al. |
| 2013/0246207 A1 | 9/2013 | Novak et al. |
| 2013/0246301 A1 | 9/2013 | Radhakrishnan et al. |
| 2013/0257590 A1 | 10/2013 | Kuenzi et al. |
| 2013/0273877 A1 | 10/2013 | Kote et al. |
| 2013/0275214 A1 | 10/2013 | Kote et al. |
| 2013/0317693 A1* | 11/2013 | Jefferies .............. G07B 15/00 701/31.5 |
| 2013/0321178 A1 | 12/2013 | Jameel et al. |
| 2013/0325521 A1 | 12/2013 | Jameel et al. |
| 2014/0047371 A1 | 2/2014 | Palmer et al. |
| 2014/0129113 A1 | 5/2014 | Van Wiemeersch et al. |
| 2014/0129301 A1 | 5/2014 | Van Wiemeersch et al. |
| 2014/0129302 A1 | 5/2014 | Amin et al. |
| 2014/0149156 A1 | 5/2014 | Schroeder |
| 2014/0156138 A1 | 6/2014 | Klaff et al. |
| 2014/0278608 A1 | 8/2014 | Johnson et al. |
| 2014/0247348 A1 | 9/2014 | Moore et al. |
| 2014/0250507 A1 | 9/2014 | Nahari |
| 2014/0266594 A1 | 9/2014 | Reiser |
| 2014/0278555 A1 | 9/2014 | Johnson et al. |
| 2014/0278607 A1 | 9/2014 | Johnson et al. |
| 2014/0279011 A1 | 9/2014 | McMullen et al. |
| 2014/0282162 A1 | 9/2014 | Fein et al. |
| 2014/0304173 A1 | 10/2014 | Ernsdorff |
| 2014/0309842 A1 | 10/2014 | Jeffries et al. |
| 2015/0012341 A1 | 1/2015 | Amin |
| 2015/0019304 A1 | 1/2015 | Vakili |
| 2015/0025925 A1 | 1/2015 | Moore et al. |
| 2015/0029038 A1 | 1/2015 | MacNeille et al. |
| 2015/0050885 A1 | 2/2015 | Vincent et al. |
| 2015/0161832 A1 | 6/2015 | Esselink et al. |
| 2015/0256332 A1 | 9/2015 | Raj et al. |
| 2015/0371153 A1 | 12/2015 | Lohmeier et al. |
| 2016/0035147 A1 | 2/2016 | Huang |
| 2016/0099927 A1 | 4/2016 | Oz et al. |
| 2016/0140649 A1 | 5/2016 | Kleve et al. |
| 2016/0203661 A1 | 7/2016 | Pudar et al. |
| 2016/0321566 A1 | 11/2016 | Liu et al. |
| 2016/0341559 A1 | 11/2016 | Camisa |
| 2016/0362084 A1* | 12/2016 | Martin .................. G01C 21/34 |
| 2017/0060559 A1 | 3/2017 | Ye et al. |
| 2017/0076399 A1 | 3/2017 | Harter et al. |
| 2017/0132533 A1 | 5/2017 | Darnell et al. |
| 2017/0132534 A1 | 5/2017 | Darnell et al. |
| 2017/0132860 A1 | 5/2017 | Darnell et al. |
| 2017/0134382 A1 | 5/2017 | Darnell et al. |

OTHER PUBLICATIONS

International Search Report and Written Opinion Issued in International Application No. PCT/US16/60972, dated Mar. 13, 2017.

* cited by examiner

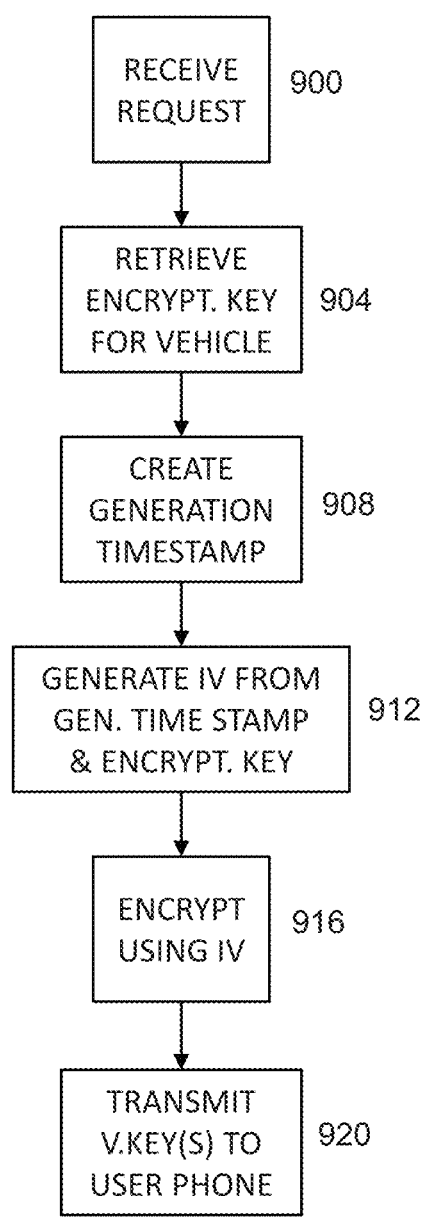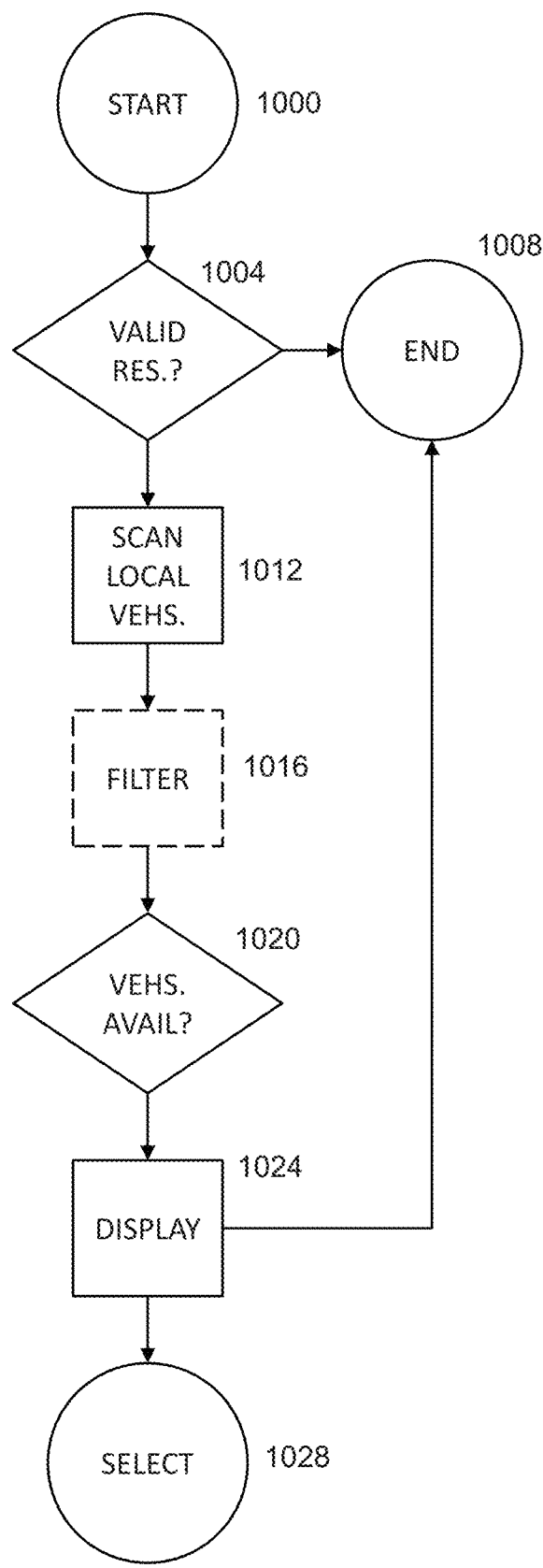
FIG. 9
FIG. 10

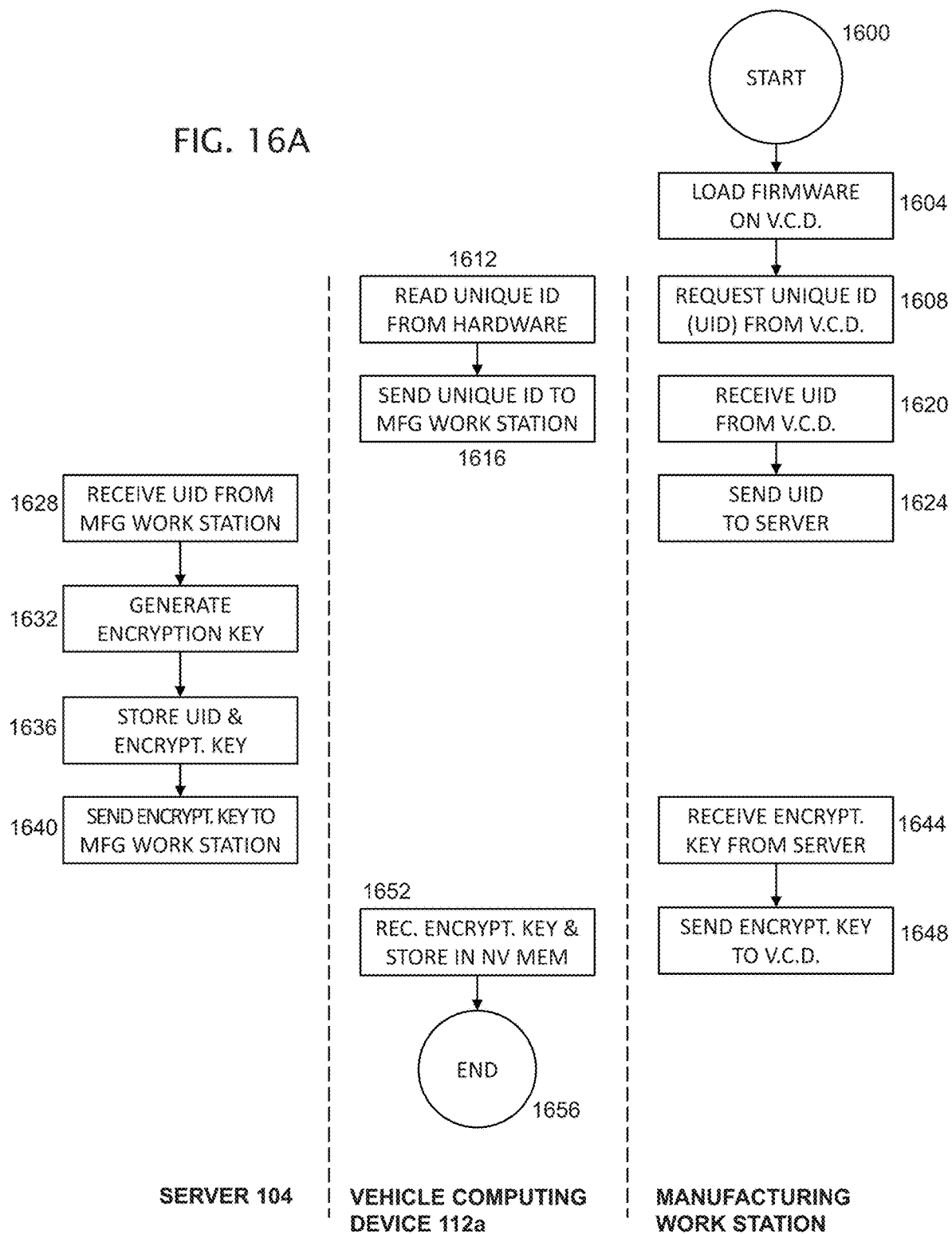

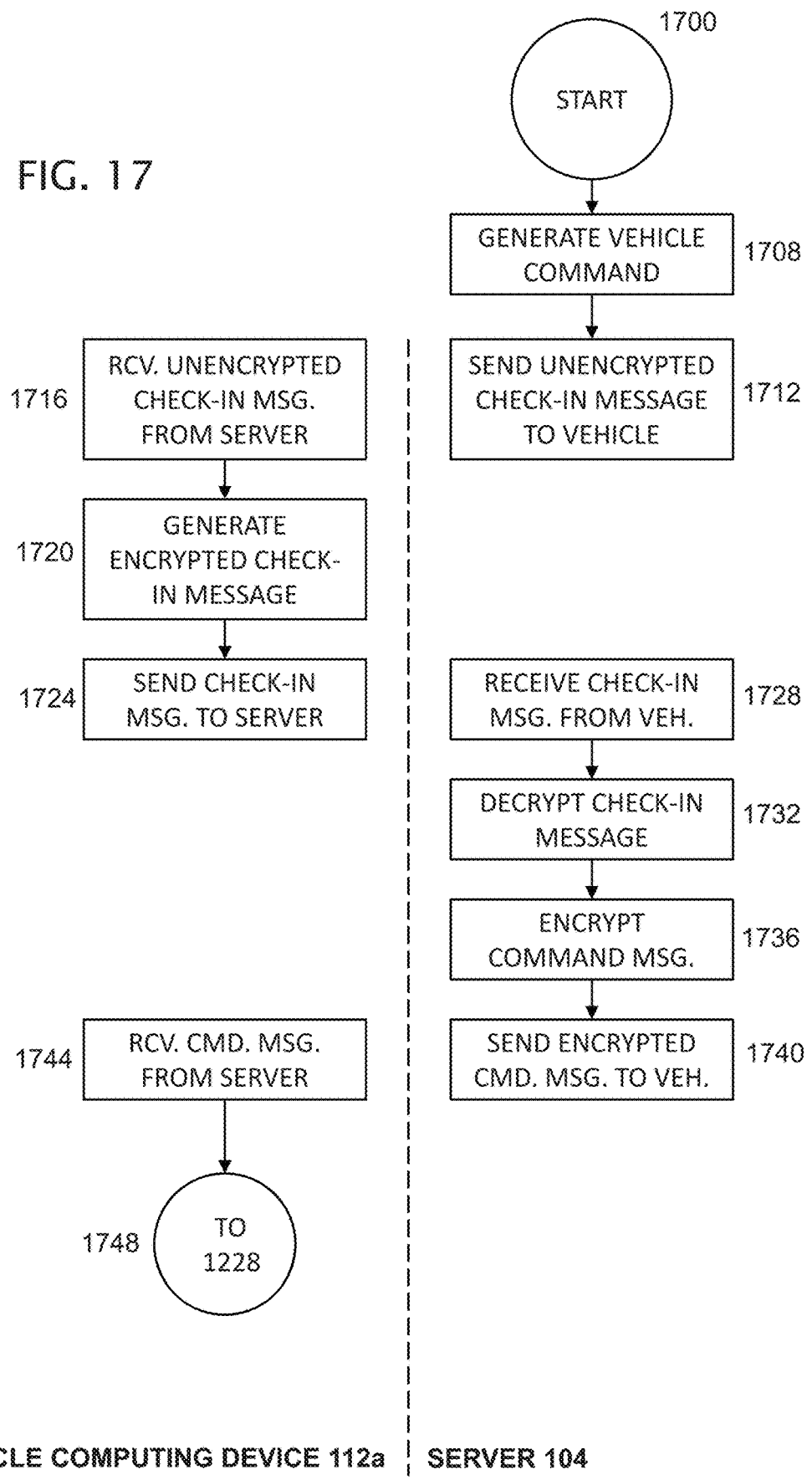

VEHICLE ACCESS SYSTEMS AND METHODS

CROSS-REFERENCE TO RELATED APPLICATIONS

This application is a continuation of U.S. application Ser. No. 15/083,395, filed Mar. 29, 2016, which claims priority to U.S. Provisional Patent Application No. 62/252,778, filed Nov. 9, 2015, the contents of each of which are incorporated herein by reference in their entirety.

FIELD OF INVENTION

The present invention relates generally to vehicle rental and vehicle sharing and more particularly, but not by way of limitation, to systems and methods for controlling access to shared or rented vehicles.

BACKGROUND

The prior art includes various systems and methods for multiple users to access and/or use a single vehicle, such as, for example, in car sharing services and rental car services. Examples of car sharing services include Car2Go and ZipCar.

One example of a rental car service includes Silvercar. Historically, the Silvercar system has permitted a user of a smartphone running the Silvercar mobile application to scan a quick response (QR) code to identify a vehicle to access, send a message to a server with the QR code or data extracted from the QR code to identify the vehicle to the server. If the selected vehicle was available for rental, the server would then send a command to a vehicle computing device—independent of the user's smartphone—to unlock the doors of the vehicle and change the vehicle to a "rented" state. Communications between the server and the vehicle also typically required an enterprise mobile application (on an administrator device) to proxy the connection or relay messages between the vehicle and the server.

SUMMARY

The present disclosure includes embodiments of systems and methods.

Some embodiments of the present systems comprise: a server comprising a portion of a reservation management (RM) system for a plurality of vehicles, the server comprising memory and a processor configured to execute instructions from the memory to: receive a request for access to a vehicle from a user's mobile computing device via an application on the mobile computing device that is configured to interact with the RM system; generate two or more virtual keys for two or more of the plurality of vehicles, each virtual key being for a specific one of the plurality of vehicles and comprising an encrypted portion that includes a command for an action to be initiated by a vehicle computing device of the specific vehicle; an send the virtual keys to the requesting user's mobile computing device. Some embodiments further comprise: a vehicle computing device in communication with a controller area network (CAN) bus of a corresponding vehicle, the vehicle computing device comprising memory and a processor configured to execute instructions from the memory to: receive from the user's mobile computing device one of the virtual keys; decrypt the encrypted portion of the virtual key; and initiate the command for the corresponding vehicle.

Some embodiments of the present systems comprise: a mobile computing device; and a vehicle computing device in communication with a controller area network (CAN) bus of a corresponding one of the plurality of vehicles. The mobile computing device can comprise a processor, memory, and an application stored in the memory and comprising instructions configured to be executed by the processor to: receive, from a server of a reservation management (RM) system that manages usage of a plurality of vehicles, two or more virtual keys for two or more of the plurality of vehicles; receive a user's selection of one of the plurality of vehicles to which one of the two or more virtual keys corresponds; identify one of the virtual keys that corresponds to the selected one of the plurality of vehicles; and transmit the identified virtual key to the selected one of the plurality of vehicles. The vehicle computing device can comprise memory and a processor configured to execute instructions from the memory to: receive from the mobile computing device the transmitted virtual key; decrypt the encrypted portion of the virtual key; and initiate the command for the corresponding vehicle. In some embodiments, the application is configured to: permit a user to select one of the specific vehicles for which a virtual key is generated and sent to the user's mobile computing device; and delete any virtual keys for specific vehicles other than the selected one of the specific vehicles. In some embodiments, the application is configured to, after a virtual key has been successfully received by a vehicle computing device of the corresponding vehicle and the command executed, delete the executed virtual key from the mobile computing device. In some embodiments, the virtual keys include two or more virtual keys for each of two or more of the plurality of vehicles. In some embodiments, the virtual keys include a first virtual key including a command to begin a reservation with a first specific vehicle, and a second virtual key including a command to end a reservation with the first specific vehicle. In some embodiments, the virtual keys further include at least a third virtual key including a command to unlock a door of the first specific vehicle, and a fourth virtual key including a command to lock a door of the first specific vehicle.

Some embodiments of the present methods comprise: receiving a request for access to a vehicle; and generating two or more virtual keys for two or more of the plurality of vehicles, each virtual key being for a specific one of the plurality of vehicles and comprising an encrypted portion that includes: a command for an action to be initiated by a vehicle computing device of the specific vehicle; and sending the virtual keys to the requesting user's mobile computing device. In some embodiments, the request for access is received with a server of a reservation management (RM) system for a plurality of vehicles; and sent from a user's mobile computing device via an application on the mobile computing device that is configured to interact with the RM system.

Some embodiments of the present systems comprise: a server comprising a portion of a reservation management (RM) system for a plurality of vehicles, the server comprising memory and a processor configured to execute instructions from the memory to: receive a request for access to a vehicle from a user's mobile computing device via an application on the mobile computing device that is configured to interact with the RM system; generate two or more virtual keys for a specific one of the plurality of vehicles, each virtual key comprising an encrypted portion that includes a command for an action to be initiated by a vehicle computing device of the specific vehicle; and send the virtual keys to the requesting user's mobile computing device. Some embodiments further comprise: a vehicle computing device in communication with a controller area network (CAN) bus of a corresponding vehicle, the vehicle computing device comprising memory and a processor configured to execute instructions from the memory to: receive from the user's mobile computing device one of the virtual keys; decrypt the encrypted portion of the virtual key; and initiate the command for the corresponding vehicle.

Some embodiments of the present systems comprise: a mobile computing device; and a vehicle computing device in communication with a controller area network (CAN) bus of a corresponding one of the plurality of vehicles. The mobile computing device can comprise a processor, memory, and an application stored in the memory and comprising instructions configured to be executed by the processor to: receive, from a server of a reservation management (RM) system that manages usage of a plurality of vehicles, two or more virtual keys for a specific one of the plurality of vehicles, each virtual key comprising an encrypted portion that includes a command for an action to be initiated by a vehicle computing device of the specific vehicle; and receive a user's selection of an action associated with or a command included in one of the two or more virtual keys; identify one of the virtual keys that corresponds to the selected action or command; and transmit the identified virtual key to the selected one of the plurality of vehicles. The vehicle computing device can comprise memory and a processor configured to execute instructions from the memory to: receive from the mobile computing device the transmitted virtual key; decrypt the encrypted portion of the virtual key; and initiate the command for the corresponding vehicle. In some embodiments, a first one of the virtual keys includes a command to begin a reservation with the specific vehicle, and a second one of the virtual keys includes a command to end a reservation with the specific vehicle. In some embodiments, a third one of the virtual keys includes a command to unlock a door of the specific vehicle, and a fourth one of the virtual keys includes a command to lock a door of the specific vehicle. In some embodiments, the application is configured to, after a virtual key has been successfully received by a vehicle computing device of the corresponding vehicle and the command executed, delete the executed virtual key from the mobile computing device.

Some embodiments of the present methods comprise: receiving a request for access to a vehicle; generating two or more virtual keys for a specific one of the plurality of vehicles, each virtual key comprising an encrypted portion that includes a command for an action to be initiated by a vehicle computing device of the specific vehicle; and sending the virtual keys to the requesting user's mobile computing device. In some embodiments, the request is: received with a server of a reservation management (RM) system for a plurality of vehicles; and sent from a user's mobile computing device via an application on the mobile computing device that is configured to interact with the RM system.

In some embodiments of the present systems, the processor of the server is configured to, when generating a virtual key for a specific vehicle, execute instructions from the memory of the server to: access an encryption key that is unique to a specific vehicle; and utilize the accessed encryption key to generate the encrypted portion of the virtual key. In some embodiments, the decryption of the encrypted portion of a virtual key depends upon an encryption key known to the server and the vehicle device, but not known to the application on the user's portable computing device.

Some embodiments of the present system comprise: a server comprising a portion of a reservation management (RM) system for a plurality of vehicles, the server comprising memory and a processor configured to execute instructions from the memory to: receive a request for access to a vehicle from a user's mobile computing device via an application on the mobile computing device that is configured to interact with the RM system; generate a virtual key for a specific one of the plurality of vehicles, each virtual key comprising an encrypted portion that include a command for an action to be initiated by a vehicle computing device of the specific vehicle, where generating the virtual key for a specific vehicle includes accessing an encryption key that is unique to the specific vehicle, and using the accessed unique encryption key to generate the encrypted portion of the virtual key; and send the virtual key to the requesting user's mobile computing device. Some embodiments further comprise: a vehicle computing device in communication with a controller area network (CAN) bus of a corresponding vehicle, the vehicle computing device comprising memory and a processor configured to execute instructions from the memory to: receive from the user's mobile computing device one of the virtual keys; decrypt the encrypted portion of the virtual key; initiate the command for the corresponding vehicle; where the memory does not include unique encryption keys of others of the plurality of vehicles such that the vehicle computing device is unable to decrypt the encrypted portions of virtual keys for others of the plurality of vehicles. Some embodiments further comprise: a mobile computing device; and a vehicle computing device in communication with a controller area network (CAN) bus of a corresponding vehicle. The mobile computing device can comprise a processor, memory, and an application stored in the memory and comprising instructions configured to be executed by the processor to: receive, from a server of a reservation management (RM) system that manages usage of a plurality of vehicles, a virtual key for a specific one of the plurality of vehicles, the virtual key comprising an encrypted portion that includes a command for an action to be initiated by a vehicle computing device of the specific vehicle, where the encrypted portion is encrypted such that decryption requires an encryption key that is unique to the specific vehicle; and transmit the virtual key to the selected one of the plurality of vehicles. The vehicle computing device comprising memory and a processor configured to execute instructions from the memory to: receive from the user's mobile computing device one of the virtual keys; decrypt the encrypted portion of the virtual key; and initiate the command for the corresponding vehicle; where the memory does not include unique encryption keys of others of the plurality of vehicles such that the vehicle computing device is unable to decrypt the encrypted portions of virtual keys for others of the plurality of vehicles.

Some embodiments of the present methods: receiving a request for access to a vehicle; generating a virtual key for a specific one of the plurality of vehicles, including accessing an encryption key that is unique to the specific vehicle and using the accessed unique encryption key to generate the encrypted portion of the virtual key, each virtual key comprising an encrypted portion that includes a command for an action to be initiated by a vehicle computing device of the specific vehicle; and sending the virtual key to the requesting user's mobile computing device. In some embodiments, the request for access is received with a server of a reservation management (RM) system for a plurality of vehicles; and sent from a user's mobile computing device via an application on the mobile computing device that is configured to interact with the RM system.

In some embodiments of the present systems, the encrypted portion of each virtual key further includes: an identifier associated with the specific vehicle. In some embodiments, the processor of the vehicle computing device is configured to execute instructions from the memory of the vehicle computing device to: validate that the virtual key identifier associated with the specific vehicle matches an identifier of the corresponding vehicle.

In some embodiments of the present systems, the encrypted portion of each virtual key comprises the entire virtual key. In some embodiments, each virtual key further comprises an unencrypted portion.

In some embodiments of the present systems that comprise a vehicle computing device, the processor of the vehicle computing device is configured to execute instructions from the memory of the vehicle computing device to: in response to receiving a valid command to begin or end a reservation, change an availability status of the corresponding vehicle. In some embodiments, the processor of the vehicle computing device is configured to execute instructions form the memory of the vehicle computing device to: in response to a change in an availability status of the corresponding vehicle, send to the server a message indicating the change in availability status. In some embodiments, the message to the server indicating the change in availability status includes one or more characteristics of the vehicle obtained from the CAN bus.

In some embodiments of the present systems that comprise a vehicle computing device, the processor of the vehicle computing device is configured to execute instructions from the memory of the vehicle computing device to: in response to a change in ignition state of the vehicle, send to the server a message including one or more characteristics of the vehicle obtained from the CAN bus.

In some embodiments of the present systems that comprise a vehicle computing device, the processor of the vehicle computing device is configured to execute instructions from the memory of the vehicle computing device to: in response to the passage of a predetermined period of time, send to the server a message including one or more characteristics of the vehicle obtained from the CAN bus.

In some embodiments of the present systems that comprise a vehicle computing device, the processor of the vehicle computing device is configured to execute instructions from the memory of the vehicle computing device to: in response to receiving an unencrypted message from the server, send to the server a message including one or more characteristics of the vehicle obtained from the CAN bus.

In some embodiments of the present systems that comprise a vehicle computing device configured to send to the server a message including one or more characteristics of the vehicle, the one or more characteristics of the vehicle include last odometer reading and fuel level. In some embodiments, the message including the one or more characteristics is encrypted.

In some embodiments of the present systems that comprise a vehicle computing device, the vehicle computing device further comprises a global positioning system (GPS) module, and the message including one or more characteristics of the vehicle obtained from the CAN also includes a location of the vehicle.

In some embodiments of the present systems that comprise a mobile computing device, the application is configured to, after a virtual key that changes an availability status has been successfully received by a vehicle computing device of the corresponding vehicle and the command executed: send a message to the server indicating the change in availability status. In some embodiments of the present systems that comprise a server, the server is configured to execute instructions from the memory of the server to: upon receipt of a message from one of the vehicle computing device or the user's mobile computing device indicating a change in availability state of a vehicle, determine whether a corresponding message has also been received from the other of the vehicle computing device or the user's mobile computing device.

In some embodiments of the present systems, the encrypted portion of at least one of the virtual keys further includes: an expiration timestamp defining the end of a time period by which the virtual key must be used; where the processor of the vehicle computing device is further configured to execute instructions from the memory of the vehicle computing device to, before executing the command of a virtual key with an expiration timestamp, validate that the expiration timestamp is not expired. In some embodiments, each of the virtual keys includes an expiration timestamp. In some embodiments, the processor of the vehicle computing device is further configured to execute instructions from the memory of the vehicle computing device to: execute an otherwise valid command to end a reservation even if the timestamp of a virtual key including the command is expired.

In some embodiments of the present systems, the encrypted portion of at least one of the virtual keys further includes: a session identifier.

In some embodiments of the present systems that comprise a vehicle computing device, the processor of the vehicle computing device is further configured to execute instructions from the memory of the vehicle computing device to: in response to receiving a valid virtual key with a command to begin a reservation, store the session identifier; and in response to subsequently receiving a virtual key with a command to end the reservation, compare the session identifier of the subsequently received virtual key to the stored session identifier; and if the compared session identifiers match, processing the command to end the reservation.

In some embodiments of the present systems, at least one of the virtual keys further comprises an unencrypted portion that includes: a key timestamp; where the processor of the vehicle computing device is further configured to execute instructions from the memory of the vehicle computing device to: generate an initialization vector from at least the key timestamp to decrypt the encrypted portion.

In some embodiments of the present systems, the decryption of the encrypted portion of a virtual key depends upon an encryption key known to the server and the vehicle device, but not known to the application on the user's portable computing device.

In some embodiments of the present systems, where the encrypted portion of at least one of the virtual keys further includes: a validation code; where the processor of the vehicle computing device is further configured to execute instructions from the memory of the vehicle computing device to: generate a random challenge phrase; generate a hash string from the validation code and challenge phrase; transmit the generated random challenge phrase to the user's mobile computing device; receive a hash string from the user's mobile computing device; and compare the received hash string to the generated hash string to validate that the virtual key originated from an authorized user's mobile computing device. In some embodiments, the encrypted portion of each of the virtual keys further includes: a validation code. In some embodiments, the validation code comprises a reservation code specific to a reservation associated with the user.

In some embodiments of the present systems that comprise a vehicle computing device, the processor of the vehicle computing device is configured to execute instructions from the memory of the vehicle computing device to: if the corresponding vehicle is configured to be compatible with a smartkey and to determine whether the smartkey is located in a cabin of the vehicle, query the CAN bus of the corresponding vehicle to determine whether the smartkey is located in the cabin. In some embodiments, the processor of the vehicle computing device is configured to not execute a command to end a reservation unless the smartkey is located in the cabin.

Some embodiments of the present systems comprise: a vehicle computing device configured to communicate with a controller area network (CAN) bus of a corresponding vehicle that is configured to be compatible with a smartkey and to determine whether the smartkey is located in a cabin of the vehicle, the vehicle computing device comprising memory and a processor configured to execute instructions from the memory to: receive a command for an action to be initiated by the vehicle computing device of the specific vehicle; decrypt the encrypted portion of the virtual key; if the command is to end a reservation, query the CAN bus to determine whether the smartkey is located in the cabin; and: if the smartkey is located in the cabin, initiate the command; or if the smartkey is not located in the cabin, send a signal to the user's mobile computing device to prompt the user to return the smartkey to the cabin.

Some embodiments of the present systems comprise: a vehicle computing device configured to communicate with a controller area network (CAN) bus of a corresponding vehicle that is configured to be compatible with a smartkey and to determine whether the smartkey is located in a cabin of the vehicle, the vehicle computing device comprising memory and a processor configured to execute instructions from the memory to: wirelessly receive a command to determine whether the smartkey is located in the cabin; query the CAN bus to determine whether the smartkey is located in the cabin; and wirelessly send a message indicative of whether the smartkey is located in the cabin. Some embodiments further comprise: a server comprising a portion of a reservation management (RM) system for a plurality of vehicles, the server comprising memory and a processor configured to execute instructions from the memory to: transmit commands to vehicle computing devices each associated with one of the plurality of vehicles to determine whether a smartkey associated with the vehicle is located in the cabin; and receive signals from the plurality of vehicle computing devices, each message indicative of whether the smartkey associated with the corresponding one of the plurality of vehicles is located in the cabin of the vehicle.

In some embodiments of the present systems that comprise a vehicle computing device, the vehicle computing device does not communicate with the CAN bus via an on-board diagnostic (OBD) port of the corresponding vehicle.

In some embodiments of the present systems that comprise a vehicle computing device, the vehicle computing device is not configured to communicate with the CAN bus via the OBD port.

Some embodiments of the present systems comprise: a mobile computing device comprising a processor, memory, a transceiver configured for local point-to-point communication, and an application stored in the memory and comprising instructions configured to be executed by the processor to: receive from a server of a reservation management (RM) system reservation information associated with a reservation for a user with which the mobile computing device is associated; receive signals from the local transceiver of each of one or more of a plurality of vehicles that are within a communications range of the local transceiver of the mobile computing device, the received signals including an indication of the state record of the corresponding vehicle; validate the reservation information; if the reservation information is validated, display to the user an indication of each of one or more vehicles that are available; receive from a user a selection of one of the available vehicle(s); and transmit the user's selection of one of the available vehicle(s) to the server. In some embodiments, the application further comprises instructions configured to be executed by the processor to: receive from the server a plurality of virtual keys for a plurality of available vehicles at a location corresponding to location of the reservation; where an indication of an available vehicle is not displayed if a virtual key has not been received from the server for that vehicle. In some embodiments, the application further comprises instructions configured to be executed by the processor to: receive from the server a virtual key for the selected one of the plurality of vehicles; and transmit the virtual key to the selected one of the plurality of vehicles. In some embodiments, each virtual key is for a specific one of the plurality of vehicles, and comprises an encrypted portion that includes: a command for an action to be initiated by a vehicle computing device of the specific vehicle. Some embodiments further comprise: a plurality of vehicles each comprising a vehicle computing device in communication with a controller area network (CAN) bus of the vehicle, the vehicle computing device comprising a processor, memory, and a local transceiver configured for local point-to-point communications, the processor configured to execute instructions from the memory to: maintain a state record indicative of whether the vehicle is available to users; transmit via the local transceiver the state. Some embodiments further comprise: a server comprising a portion of a reservation management (RM) system for a plurality of vehicles, the server comprising memory and a processor configured to execute instructions from the memory to: store a reservation for a user to use one of the plurality of vehicles; and transmit reservation information associated with the reservation to a mobile computing device associated with the user. In some embodiments, the processor of the server is configured to execute instructions from the memory to: receive from the user's portable computing device a request for access including the user's selection of the one of the available vehicles; generate a virtual key for the selected one of the available vehicles; and send the virtual key to the user's mobile computing device. In some embodiments, the virtual key comprises an encrypted portion that includes: a command for an action to be initiated by a vehicle computing device of the specific vehicle.

Some embodiments of the present systems comprise: a server comprising a portion of a reservation management (RM) system for a plurality of vehicles, the server comprising memory and a processor configured to execute instructions from the memory to: receive an encrypted message from a manufacturing work station in communication with a vehicle computing device, the message including a unique identifier (UID) associated with the vehicle computing device; decrypt the message; generate a unique encryption key from the UID; store the UID and the unique encryption key; generate an encrypted message that includes the unique encryption key for the vehicle computing device; and send the generated message to the manufacturing work station for storage in the vehicle computing device. Some embodiments further comprise: the vehicle computing device configured to communicate with a controller area network (CAN) bus of a vehicle, the vehicle computing device comprising memory and a processor, the memory storing a plurality of vehicle types and settings associated with each vehicle type, the processor configured to execute instructions from the memory to: query the CAN bus for the VIN of the vehicle; generate an encrypted message that includes the VIN and the UID; send the encrypted message to the server; receive an encrypted message from the server with a vehicle type associated with the vehicle; decrypt the received message; set the vehicle type in the nonvolatile memory of the vehicle computing device; and reboot with the settings associated with the set vehicle type.

Some embodiments of the present systems comprise: a vehicle computing device configured to communicate with a controller area network (CAN) bus of a corresponding vehicle, the vehicle computing device comprising memory and a processor, the memory storing a plurality of vehicle types and settings associated with each vehicle type, the processor configured to execute instructions from the memory to: query the CAN bus for a vehicle identification number (VIN) of the vehicle; generate an encrypted message that includes the VIN and a unique identifier (UID) associated with the vehicle computing device; send the encrypted message to the server; receive an encrypted message from the server with a vehicle type associated with the vehicle; decrypt the received message; and set the vehicle type in the nonvolatile memory of the vehicle computing device; and reboot with the settings associated with the set vehicle type.

Some embodiments of the present methods comprise: receiving an encrypted message including a unique identifier (UID) associated with a vehicle computing device (e.g., the encrypted message being received with a server of a reservation management (RM) system for a plurality of vehicles; and sent from a manufacturing work station in communication with the vehicle computing device); decrypting the message; generating a unique encryption key from the UID; storing the UID and the unique encryption key; generating an encrypted message that includes the unique encryption key for the vehicle computing device; and sending the generated message to the manufacturing work station for storage in the vehicle computing device.

Some embodiments of the present methods comprise: querying a controller area network (CAN) bus of a vehicle for a vehicle identification number (VIN) of the vehicle; generating an encrypted message that includes the VIN and the UID; sending the encrypted message to the server; receiving an encrypted message from the server with a vehicle type associated with the vehicle; decrypting the received message; setting the vehicle type in nonvolatile memory of a vehicle computing device in communication with the CAN bus, the vehicle computing device comprising memory storing a plurality of vehicle types and settings associated with each vehicle type; and rebooting the vehicle computing device with the settings associated with the set vehicle type.

Some embodiments of the present systems comprise: a vehicle computing device in communication with a controller area network (CAN) bus of a corresponding vehicle, the vehicle computing device comprising, a cellular modem, memory, and a processor configured to execute instructions from the memory to: receive a check-in prompt message from a server of a reservation management (RM) system; in response to receiving the check-in prompt message, generate a check-in request message including a unique reference; send the check-in request message to the server; receive from the server a command message including one or more commands for the vehicle computing device; and if the command message is consistent with the unique reference in the check-in request message, execute the one or more commands. In some embodiments, at least a portion of the check-in request message is encrypted. In some embodiments, at least a portion of the command message is encrypted, and the processor is further configured to execute instructions from the memory to: decrypt the command message. In some embodiments, the check-in prompt message received by the vehicle computing device is not encrypted. In some embodiments, the vehicle computing device is configured to not execute command messages received via the cell modem that are not sent by the server responsive to a check-in request message sent to the server by the vehicle computing device. In some embodiments, the vehicle computing device is configured to not execute command messages received from the server that are not sent by the server responsive to a check-in request message sent to the server by the vehicle computing device. Some embodiments further comprising: a server comprising a portion of a reservation management (RM) system for a plurality of vehicles, the server comprising memory and a processor configured to execute instructions from the memory to: generate the command message including one or more command messages for the vehicle computing device; generate a check-in prompt message including a unique reference; transmit the check-in prompt message to the vehicle computing device; receive from the vehicle computing device a check-in request message including a unique reference; encrypt the command message using the unique reference; and send the encrypted command message to the vehicle computing device. In some embodiments, at least a portion of the check-in request message is encrypted and the processor of the server is further configured to execute instructions from the memory of the server to: decrypt the received check-in request message. In some embodiments, the check-in prompt message received by the vehicle computing device is not encrypted. In some embodiments, the vehicle computing device is configured to not execute command messages received via the cell modem that are not sent by the server responsive to a check-in request message sent to the server by the vehicle computing device. In some embodiments, the vehicle computing device is configured to not execute command messages received from the server that are not sent by the server responsive to a check-in request message sent to the server by the vehicle computing device.

Some embodiments of the present systems comprise: a server comprising a portion of a reservation management (RM) system for a plurality of vehicles, the server comprising memory and a processor configured to execute instructions from the memory to: generate a command message including one or more command messages for a vehicle computing device in communication with a controller area network (CAN) bus of a corresponding vehicle; generate a check-in prompt message including a unique reference; transmit the check-in prompt message to the vehicle computing device; receive from the vehicle computing device a check-in request message including a unique reference; encrypt the command message using the unique reference; and send the encrypted command message to the vehicle computing device. In some embodiments, at least a portion of the check-in request message is encrypted and the processor of the server is further configured to execute instructions from the memory of the server to: decrypt the received check-in request message. In some embodiments, the server is configured to transmit the check-in prompt message via a cell modem. In some embodiments, the check-in prompt message is not encrypted.

Some embodiments of the present methods comprise: receiving a check-in prompt message with a vehicle computing device in communication with a controller area network (CAN) bus of a corresponding vehicle, the check-in prompt message sent from a server of a reservation management (RM) system; generating, in response to receiving the check-in prompt message, a check-in request message including a unique reference; sending the check-in request message to the server; receiving from the server a command message including one or more commands for the vehicle computing device; and executing the one or more commands if the command message is consistent with the unique reference in the check-in request message. In some embodiments, at least a portion of the check-in request message is encrypted. In some embodiments, at least a portion of the command message is encrypted, and the method further comprises: decrypting the command message. In some embodiments, the check-in prompt message is transmitted via a cell modem. In some embodiments, the check-in prompt message received by the vehicle computing device is not encrypted. In some embodiments, the vehicle computing device is configured to not execute command messages received via the cell modem that are not sent by the server responsive to a check-in request message sent to the server by the vehicle computing device. In some embodiments, the vehicle computing device is configured to not execute command messages received from the server that are not sent by the server responsive to a check-in request message sent to the server by the vehicle computing device.

Some embodiments of the present methods comprise: generating a command message including one or more command messages for a vehicle computing device in communication with a controller area network (CAN) bus of a vehicle; generating a check-in prompt message including a unique reference; transmitting the check-in prompt message to the vehicle computing device; receiving from the vehicle computing device a check-in request message including a unique reference; encrypting the command message using the unique reference; and sending the encrypted command message to the vehicle computing device in response to the received check-in request message. In some embodiments, at least a portion of the check-in request message is encrypted, and the method further comprises: decrypting the received check-in request message. In some embodiments, the check-in prompt message is transmitted via a cell modem. In some embodiments, the check-in prompt message is not encrypted. In some embodiments, the check-in prompt message received by the vehicle computing device is not encrypted. In some embodiments, the vehicle computing device is configured to not execute command messages received via the cell modem that are not sent by the server responsive to a check-in request message sent to the server by the vehicle computing device. In some embodiments, the vehicle computing device is configured to not execute command messages received from the server that are not sent by the server responsive to a check-in request message sent to the server by the vehicle computing device.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 9 depicts a flowchart illustrating a process by which some embodiments of the present servers generate a virtual key.

FIG. 10 depicts a flowchart illustrating a process by which some embodiments of the present portable computing devices and/or applications identify and display available vehicles for selection by a user.

FIGS. 16A-16B depict flowcharts illustrating a process by which some embodiments of the present vehicle computing devices are paired with a new vehicle and information associated with the pairing is generated and stored in some embodiments of the present servers.

FIG. 17 depicts a flowchart illustrating a process by which at least some embodiments of the present servers and vehicle computing devices interact for the server to send command messages to the vehicle computing device.

DETAILED DESCRIPTION OF ILLUSTRATIVE EMBODIMENTS

Figure 1:
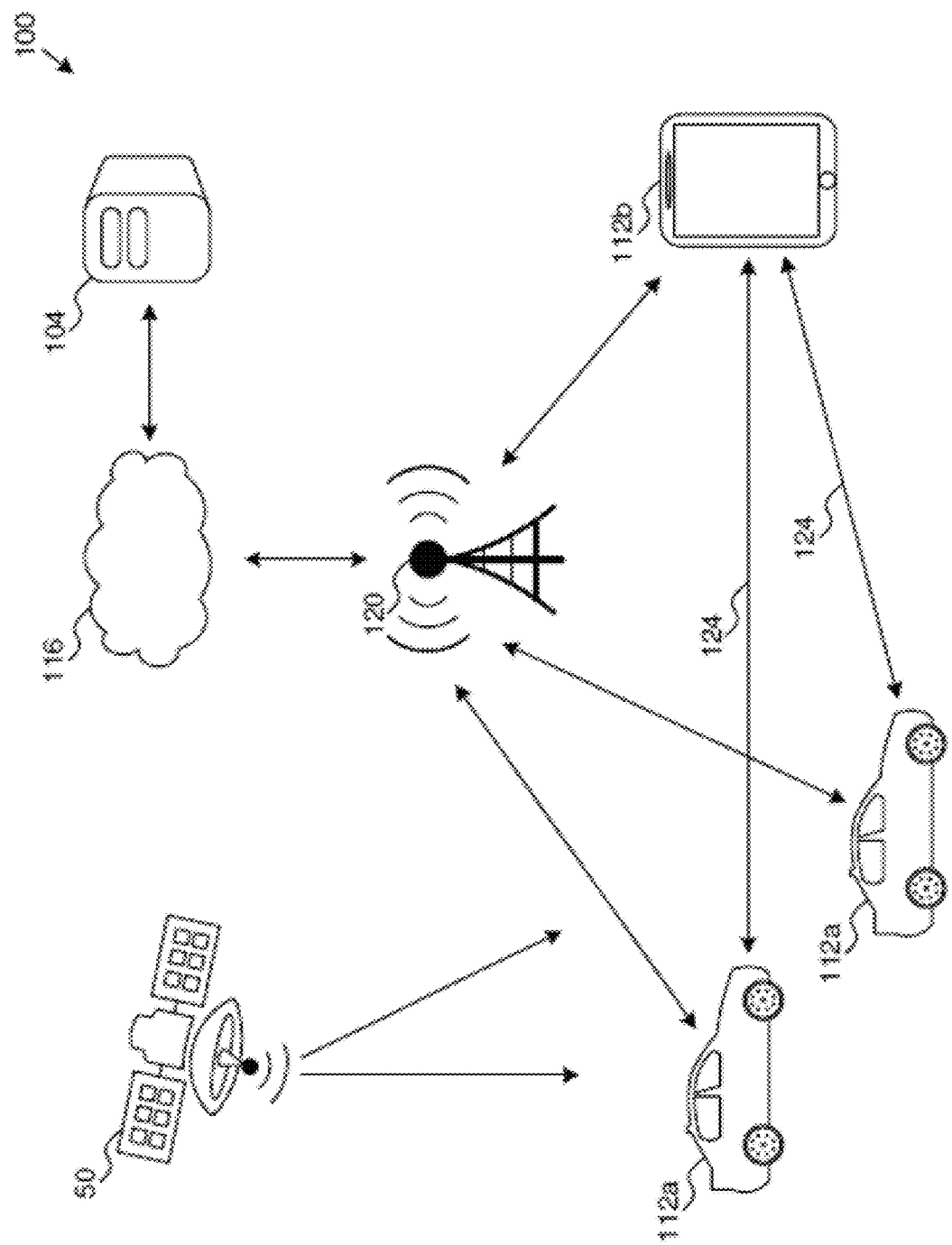
FIG. 1 is a schematic block diagram illustrating one of the present systems.

Referring now to the drawings, and more particularly to FIG. 1, shown therein and designated by the reference numeral 100 is an embodiment of the present systems. In the embodiment shown, system 100 comprises a server 104, and comprises and/or is configured to interact with one or more interface devices 116. In some embodiments, interface devices 116 can comprise one or more vehicle computing devices 112a (e.g., coupled to at least one corresponding vehicle as described in more detail below) which can be configured to communicate with server 104 over a network 116 (e.g., the Internet) via wireless communication path 120 such as CDMA, GSM, WiFi, and/or any other wireless communication path that enables the functionality described in this disclosure. As conceptually illustrated, and as described in more detail below, some embodiments of the present vehicle computing devices 112a can be configured to communicate with global positioning system (GPS) satellites 50 to determine a position of the vehicle computing device 112a. "GPS" is used generically herein to refer to any of various satellite positioning systems, such as, for example, GPS, QZSS, GLONASS, Galileo, CompassBeidou, and/or the like. Many embodiments of the present systems will comprise and/or be configured to interact with multiple vehicle computing devices 112a. For example, many reservation management (RM) systems manage and/or coordinate usage of dozens, hundreds, or thousands of vehicles, each of which would include its own vehicle computing device 112a.

Interface devices 112 can additionally or alternatively comprise at least one portable computing device 112b (e.g., smart phones, tablets, and/or other portable computing devices, as will be described in more detail below), which can be configured to communicate with server 104 over a network 116 (e.g., the Internet) via wireless communication path 120 such as, for example, CDMA, GSM, WiFi, and/or any other wireless communication path that enables the functionality described in this disclosure. As conceptually illustrated, and as described in more detail below, a portable computing device 112b can be configured to communicate directly with a vehicle computing device 112a via a local point-to-point communication path 124 such as, for example, Bluetooth, Bluetooth Low Energy (BLE), and/or any other local point-to-point communication path or protocol that enables the functionality described in this disclosure. Many embodiments of the present systems will comprise and/or be configured to interact with multiple vehicle computing devices 112a.

Interface devices 112 can also include stationary and/or portable personal computers, such as, for example, to allow administrative and/or client users to interact with server 104, vehicle computing devices 112a, and/or portable computing devices 112b to perform various functions (e.g., add a vehicle to the system, create reservation, begin reservation, end reservation, unlock vehicle doors to permit vehicle access, and/or the like).

Figure 2:
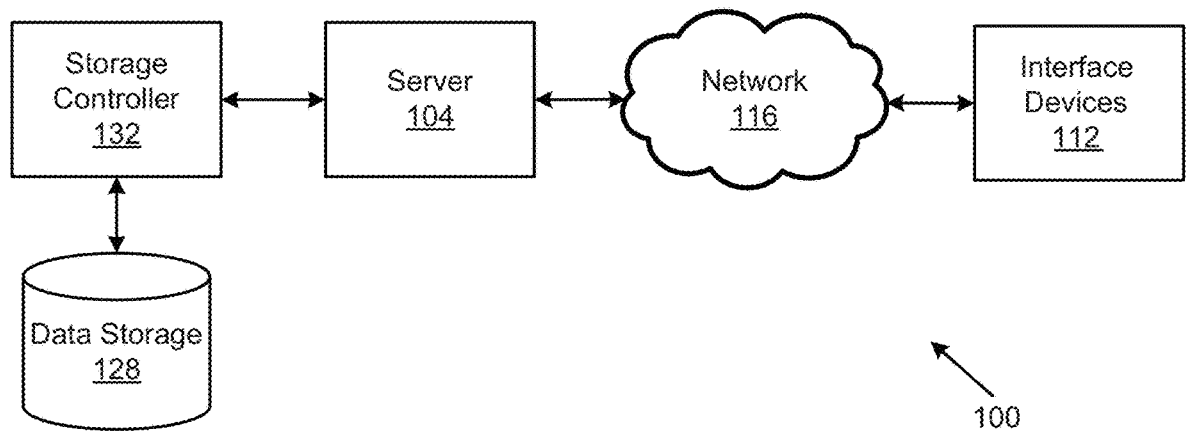
FIG. 2 is a schematic block diagram illustrating a portion of the system of FIG. 1.

FIG. 2 conceptually illustrates one embodiment of a system 100 that can be used to implement at least some of the present embodiments. System 100 may include a server 104, a data storage device 128, a network 116, and an interface device 112. In some embodiments, server 104 may include storage device 128 (e.g., a server housing or enclosure may house storage device 128). In some embodiments, system 100 may include a storage controller 132, and/or a storage server configured to manage data communications between data storage device 128 and server 104 and/or other components in communication with network 116. In some embodiments, storage controller 132 may be coupled to network 116 (e.g., such that server 104 communicates or is configured to communicate with storage controller 132 and/or storage device 128 via network 116. In a general embodiment, system 100 may be configured to store data (e.g., vehicle records, user records, vehicle reservation and/or usage records, and/or the like). In some embodiments, system 100 is configured to permit multiple uses and/or functions to or with the data. For example, in some embodiments, system 100 is configured to permit multiple users (e.g., system administrative users, third-party administrative users, client users) to interact with the system simultaneously (e.g., a system administrative user adding a vehicle to the system, a third-party administrative user adding a reservation, a client user beginning a reservation of a specific vehicle, and/or the like).

In some embodiments, server 104 is configured to access data stored in data storage device(s) 104 via a Storage Area Network (SAN) connection, a LAN, a data bus, or the like. Data storage device 128 may include a hard disk, including hard disks arranged in an Redundant Array of Independent Disks (RAID) array, a tape storage drive comprising a magnetic tape data storage device, an optical storage device, or the like. In one embodiment, data storage device 128 stores various types of data, as described in more detail below. In some embodiments, server 104 and/or storage device(s) 104 are configured to create a back-up (full and/or partial back-up) of the data.

Interface device 112 is referred to broadly and comprises a suitable processor-based device such as, for example, a desktop computer, a laptop computer, a vehicle computing device 112*a*, and/or a mobile computing device 112*b* (e.g., a cellular phone, smartphone, etc.) having access to the network 116. In some embodiments (e.g., mobile computing device 112*b*), an interface device can be configured to access the Internet (e.g., via an application on the interface device or to access a web application or web service hosted by server 104) and thereby provide a user interface for enabling a user to enter or receive information (e.g., from server 104). For example, a user may receive or view, via interface device 112, a webpage or an application screen (e.g., server 104 can transmit instructions to interface device 112 to instruct or cause the interface device to render a webpage or application screen). By way of further example, in some embodiments (e.g., portable computing device 112*b*), an interface device can be configured to receive input from a user (e.g., via user-input, such as a touchscreen and/or the like), can be configured to prompt (e.g., visually) a user for input, and/or can be configured to transmit to server 104 (e.g., via network 116) input received from a user.

In some embodiments, the functions described in this disclosure may be performed by server 104 (e.g., interface device 112 may provide a terminal for accessing the computing/processing function of the server); may be performed by server 104 and an interface device 112 (e.g., server 104 may perform some processing and interface device 112 may perform some processing); or may be performed entirely by interface device 112. For example, in some embodiments, a portable computing device 112*b* includes an application running on the device (e.g., a processor executing from memory instructions comprised by the application), such that all of certain functions are performed by the portable computing device. By way of further example, in some embodiments, a vehicle computing device 112*a* includes firmware and/or software including executable instructions in memory of the vehicle computing device that can be executed by a processor of the vehicle computing device.

Figure 3:
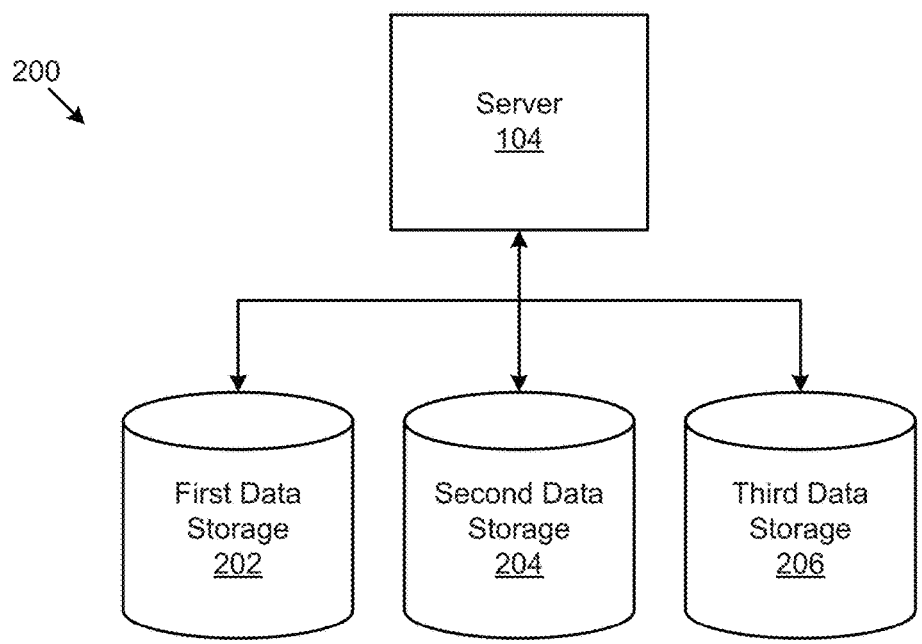
FIG. 3 is a schematic block diagram illustrating a database suitable for use in some of the present systems.

FIG. 3 illustrates one embodiment of a data management system 200 configured to store and manage data for the present embodiments. In one embodiment, the system 200 may include a server 104. The server 104 may be coupled to a data-bus as conceptually illustrated by the lines between the server and the storage devices. In one embodiment, the system 200 may also include a first data storage device 202, a second data storage device 204 and/or a third data storage device 206. In further embodiments, the system 200 may include additional data storage devices (not shown). In such an embodiment, each data storage device 202-206 may host a separate database of information. For example, in some embodiments, each of storage devices 202-206 can store or be configured to store different types of data (e.g., storage device 202 storing vehicle records, storage device 204 storing user records, storage device 206 storing reservation and/or usage records, etc.). In some embodiments, storage devices 202-206 may be arranged in a RAID configuration for storing redundant copies of a database or databases (e.g., through synchronous or asynchronous redundancy updates).

In various embodiments, server 104 may communicate with data storage devices 204-210 over a data-bus (illustrated by arrows between server 104 and storage devices 202-206). In such embodiments, the data-bus may comprise a SAN, a LAN, or the like. The communication infrastructure may include Ethernet, Fibre-Channel Arbitrated Loop (FC-AL), Small Computer System Interface (SCSI), and/or other similar data communication schemes associated with data storage and communication. For example, server 104 may communicate indirectly with data storage devices 202-206, (e.g., via a storage server or storage controller 132).

Server 104 may host one or more software applications (e.g., web- and/or Internet-accessible software applications) configured and/or programmed to perform the functions described in this disclosure. The software application may further include modules configured to interface with data storage devices 202-206, network 116, a user (e.g., via an interface device 112), and/or the like. In a further embodiment, server 104 may host an engine, application plug-in, or application programming interface (API). In another embodiment, server 104 may host a web service and/or other web accessible software application. In some embodiments, server 104 comprises one or more virtual servers.

Figure 4:
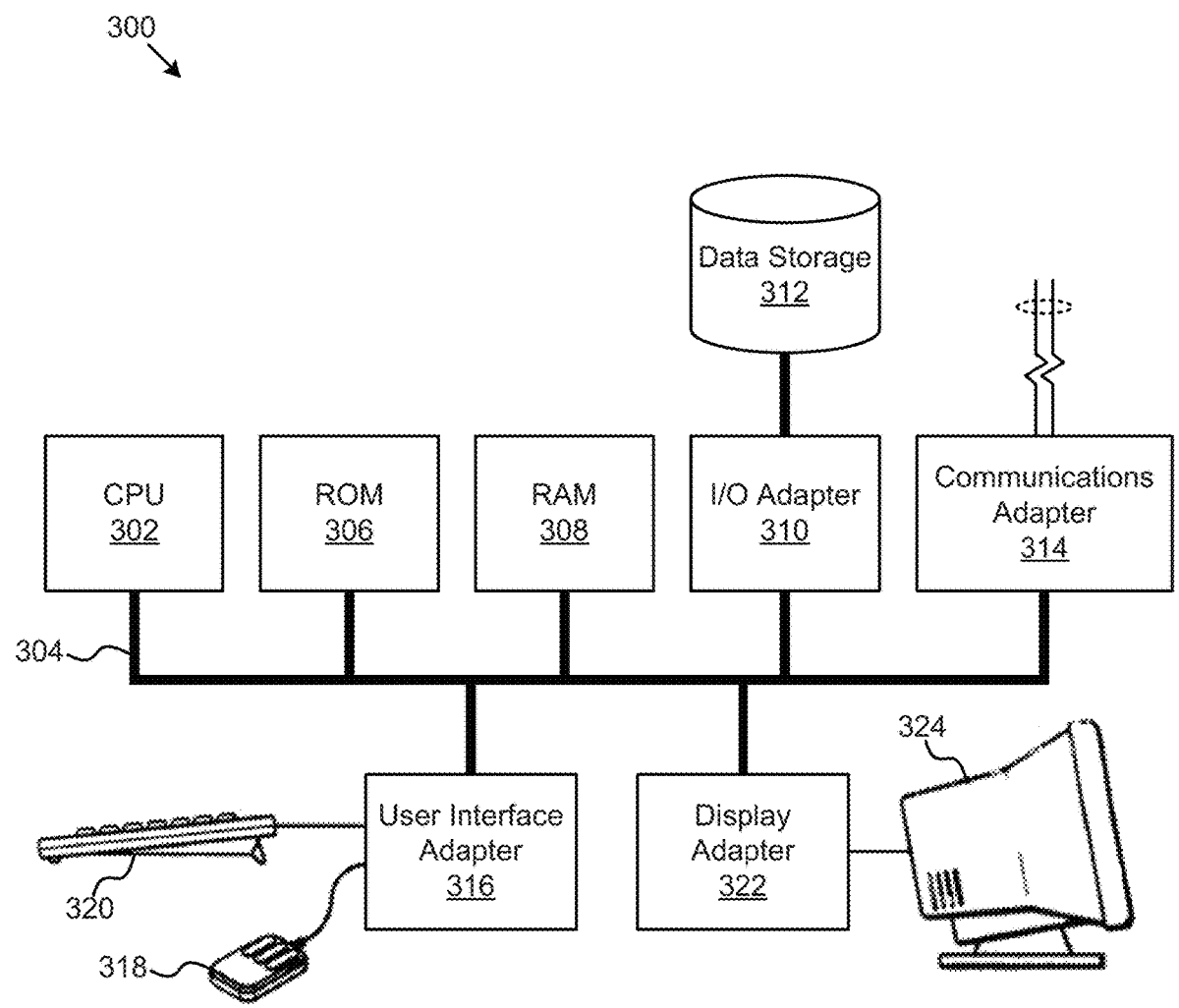
FIG. 4 is a schematic block diagram illustrating one embodiment of a computer suitable for use with or in at least some of the present systems.

FIG. 4 illustrates a computer system 300 adapted according to certain embodiments of server 104 and/or interface device 112. Central processing unit (CPU) 302 is coupled to system bus 304. CPU 302 may be a general purpose CPU or microprocessor. The present embodiments are not restricted by the architecture of CPU 302, as long as CPU 302 supports the modules, configurations, and/or operations as described herein. CPU 302 may execute the various logical instructions according to the present embodiments. For example, CPU 302 may execute machine-level instructions according to the exemplary operations described below. Computer system 300 also may include Random Access Memory (RAM) 308, which may be SRAM, DRAM, SDRAM, or the like. Computer system 300 may utilize RAM 308 to store the various data structures used by a software application configured as described in this disclosure. Computer system 300 may also include Read Only Memory (ROM) 306 which may be PROM, EPROM, EEPROM, optical storage, or the like. ROM 306 may store configuration information for booting computer system 300. RAM 308 and ROM 306 may also store user and/or system 100 data.

Computer system 300 may also include an input/output (I/O) adapter 310, a communications adapter 314, a user interface adapter 316, and a display adapter 322. I/O adapter 310, communications adapter 314, and/or interface adapter 316 may, in some embodiments, enable or a user to interact with computer system 300 (e.g., to make, begin, or end a reservation). In a further embodiment, display adapter 322 may display a graphical user interface associated with a software or web-based application.

I/O adapter 310 may connect to one or more storage devices 312, such as one or more of a hard drive, a Compact Disk (CD) drive, a floppy disk drive, a tape drive, to the computer system 300. Communications adapter 314 may be adapted to couple computer system 300 to network 132, which may, for example, be one or more of a LAN, WAN, and/or the Internet. User interface adapter 316 couples user input devices, such as a keyboard 320, a pointing device 318, and a microphone and/or audio speaker, to computer system 300. Display adapter 322 may be driven by CPU 302 to control the display on display device 324.

The present embodiments are not limited to the architecture of system 300. Rather computer system 300 is provided as an example of one type of computing device that may be adapted to perform the functions of a server 104 and/or various interface devices 112. For example, any suitable processor-based device may be utilized with appropriate special-purpose programming, including without limitation, including computer game consoles, smart phones, tablets, and multi-processor servers. Other embodiments and configurations may omit certain elements. For example, as described in more detail below, vehicle computing device 112b does not include a user interface. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 5:
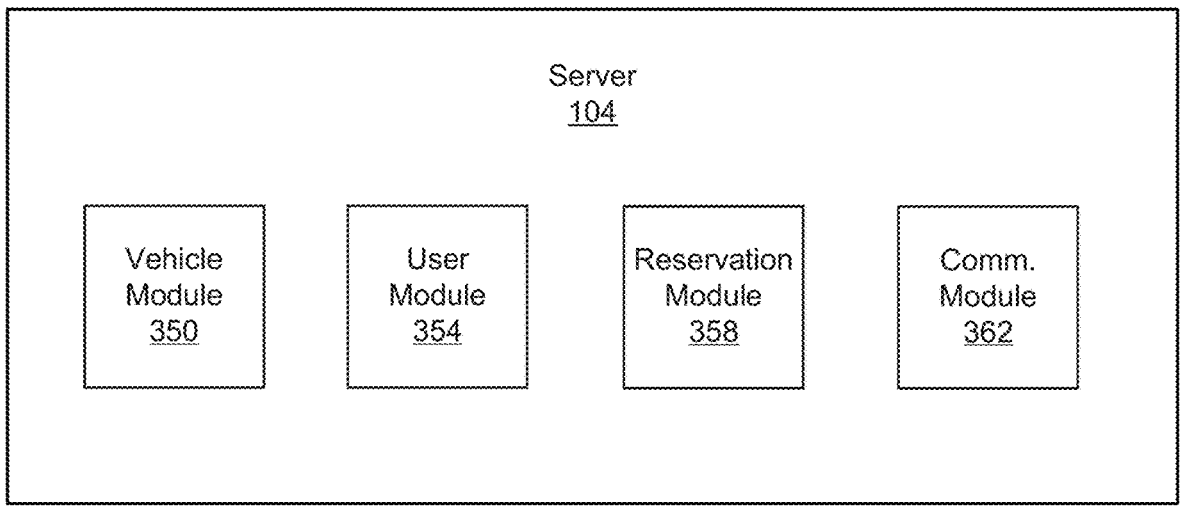
FIG. 5 depicts a schematic block diagram illustrating one embodiment of server suitable for use with or in some of the present systems.

FIG. 5 illustrates a further embodiment of a server 104 for a vehicle management (VM) system. In the embodiment shown, server 104 includes a plurality of modules configured to perform the functions described in this disclosure. Although server 104 is described as having a plurality of modules, in some embodiments, such modules are conceptual (e.g., such modules are not necessarily distinct physical pieces or segments of code, and may instead be combined into multiple combinations of the modules described, or into a single module that is configured to perform some or all of the functions described). In other embodiments, the modules described may be combined, omitted, and/or substituted in any combination of individual modules and/or functions described. In the embodiments shown, server 104 broadly includes a vehicle module 350, a user module 354, a reservation module 358, and a communications module 362.

In the embodiment shown, vehicle module 350 is generally configured to perform functions related to managing records associated with a plurality of vehicles the use of which is managed and/or coordinated by the RM system. For example, vehicle module 350 may receive data indicative of a vehicle the use of which is to be managed and/or coordinated by the RM system, create a record associated with that vehicle, and/or add and/or update information in that record as the vehicle is used. By way of further example, vehicle module 350 may provide information related to various vehicles (e.g., available vehicles) to reservation module 358, such as, for example, in response to a client action to initiate making a new reservation.

In the embodiment shown, user module 354 is generally configured to perform functions related to managing records associated with a plurality of users of the system, such as, for example, may be approved or otherwise able to use vehicles managed by the system. For example, user module may receive information about a user, create a record associated with that user, and/or add and/or update information about that user as the user interacts with the system. In some embodiments, security module 354 is configured to permit different levels of access for different users. Some users or types of users may be system administrators with administrator-level access to system 100, such as, for example, permission to read and edit files. Some users may have more-limited access to system 100, such as, for example, third-party administrator users permission to read and edit only certain files, or client users with permission to only read limited files, and/or the like.

In the embodiment shown, reservation module 358 is generally configured to interface with vehicle module 350 and user module 354 to respond to and/or fulfill user requests for reservations and/or other terms of use of vehicles managed by the VM system. For example, reservation module 358 may receive a user request for a vehicle at a certain place and time and communicate with vehicle module 350 to determine whether a vehicle is expected to be or could be made available at such place and time. By way of further example, reservation module 358 may process requests to modify, terminate, begin, or end a reservation.

In the embodiment shown, communication module 358 is generally configured to coordinate communications and security protocols for communications (e.g., encryption) for various users interacting with server 104 via network 116. For example, in some embodiments, communication modules 358 is configured to encrypt messages to different sources in different ways, such as, for example, using different unique encryption keys for each of different vehicle computing devices associated with different vehicles, and/or using different encryption protocols with different types of user interface devices 112 (e.g., a personal computer versus a smartphone, an Apple iOS phone versus an Android smartphone).

Figure 6:
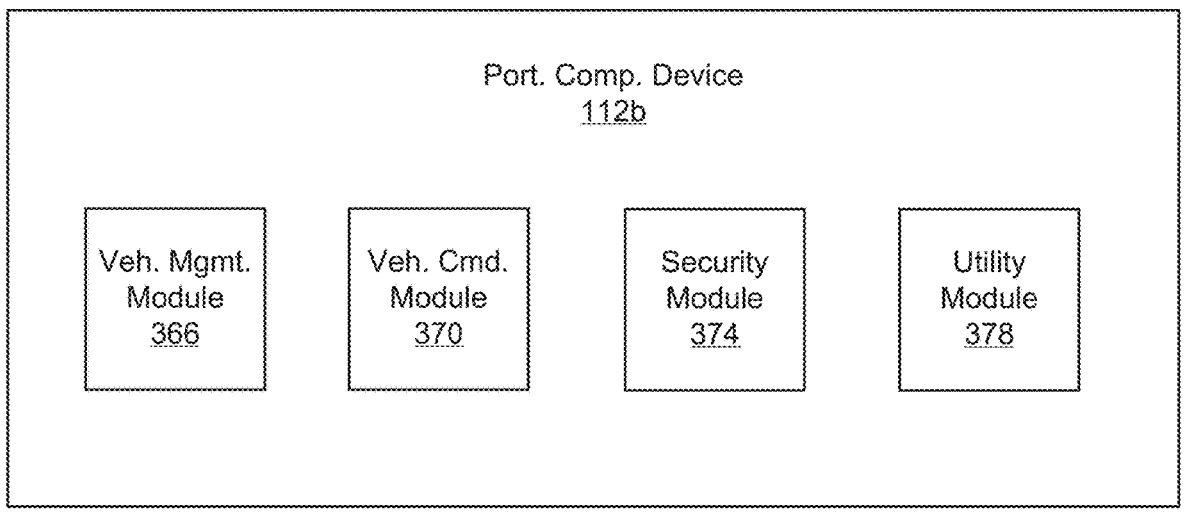
FIG. 6 depicts a schematic block diagram illustrating one embodiment of portable computing device suitable for use with or in some of the present systems.

FIG. 6 illustrates a further embodiment of a portable computing device 112b. In the embodiment shown, device 112b and, more particularly an application comprising instructions that are executable by a processor of device 112b from memory of device 112b, includes a plurality of modules configured to perform the functions described in this disclosure. Although device 112b is described as having a plurality of modules, in some embodiments, such modules are merely conceptual (e.g., such modules are not necessarily distinct physical pieces or segments of code, and may instead be combined into multiple combinations of the modules described, or into a single module that is configured to perform some or all of the functions described). In other embodiments, the modules described may be combined, omitted, and/or substituted in any combination of individual modules and/or functions described. In the embodiments shown, device 112b broadly includes a vehicle management module 366, a vehicle command module 370, a security module 374, and a utility module 378.

In the embodiment shown, vehicle management module 366 is generally configured to perform functions related to identifying, filtering, and/or connecting/disconnecting local point-to-point communications with vehicles (e.g., vehicle computing modules 112a) according to certain characteristics, such as, for example, availability status of a vehicle, proximity (e.g., communications signal strength), whether or not the application on portable computing device 112b has a virtual key for the vehicle, and/or other characteristics. For example, and as described in more detail below, vehicle management module 366 can be configured to scan for available vehicles in a user's location and display indicators of at least some of those vehicles to permit a user to select one of the vehicles to rent and/or otherwise use. By way of further example, vehicle management module may scan for and initiate communications with a particular vehicle in the user's location that is preselected for the user to rent and/or otherwise begin a usage session.

In the embodiment shown, vehicle command module 370 (portable computing device 112b) is generally configured to interact with the vehicle (e.g., vehicle computing device 112a) to transmit commands (e.g., in the form of virtual keys, as described in more detail below) for the vehicle. For example, and as described in the more detail below, vehicle command module 370 can be configured to transmit a virtual key to a vehicle computing device 112a of a corresponding vehicle to begin a reservation with the corresponding vehicle, which virtual key may include commands to unlock door(s), unlock and open the trunk, change the availability state of the vehicle from "available" or "staged" to "rented" or "in use," and or other commands. By way of further example, vehicle command module 370 can be configured to transmit virtual keys with other commands, such as "lock" or "unlock," during an active reservation. As another example, for administrator personal computing devices 112*b* (e.g., those with an administrator version of the application, or a version of the application with active administrative privileges), vehicle command module 370 may be configured to transmit commands to change the availability state of a vehicle (e.g., after being cleaned and refueled) from "returned" to "available" or "staged."

In the embodiment shown, security module 374 is generally configured to manage virtual keys and other application-specific security related functions, such as, for example, security protocols between portable computing device 112*b* and vehicle computing devices 112*a*, examples of which are described in more detail below. For example, for some types of virtual keys (e.g., those including a command to start a reservation or end a reservation), once the virtual key has been transmitted from a user's phone (portable computing device 112*b*) to a vehicle and the command(s) successfully executed by the vehicle, security module 374 can be configured to delete the virtual key from the portable computing device so the user cannot use the same virtual key a second time. By way of further example, and as described in more detail below, in embodiments in which virtual keys for multiple available cars are transmitted to a user's phone (portable computing device 112*b*), once a user has started a reservation for a particular one of the vehicles, security module 374 can be configured to delete virtual keys for any other cars from the portable computing device so the user cannot start a reservation with a second car (at least not without further interaction with the system to ensure that the first reservation has ended and access to and use of the first car terminated).

In the embodiment shown, utility module 378 is generally configured to perform other, more-basic functions of the application on portable computing device 112*b*. For example, in some embodiments, utility module 378 can be configured to manage and present a user interface permitting a user to enter, and the application to receive and recognize user inputs of, requests for and creation of new reservations, selection of a particular car from among a plurality of available cars, locking/unlocking or otherwise accessing a car, beginning and ending reservations with a particular available car, and/or the like. By way of further example, the utility module 378 can be configured to perform back-end functions that are ancillary to tasks primarily performed by other modules, such as, for example, requesting information (e.g., fuel level, door lock state, window open state, whether a smartkey is present in the cabin of the vehicle, and/or the like) from a vehicle computing device 112*a* in conjunction with (e.g., which may be preconditions to) ending a reservation for that vehicle, and may be further configured to transmit that information to server 104 via network 116.

Figure 7:
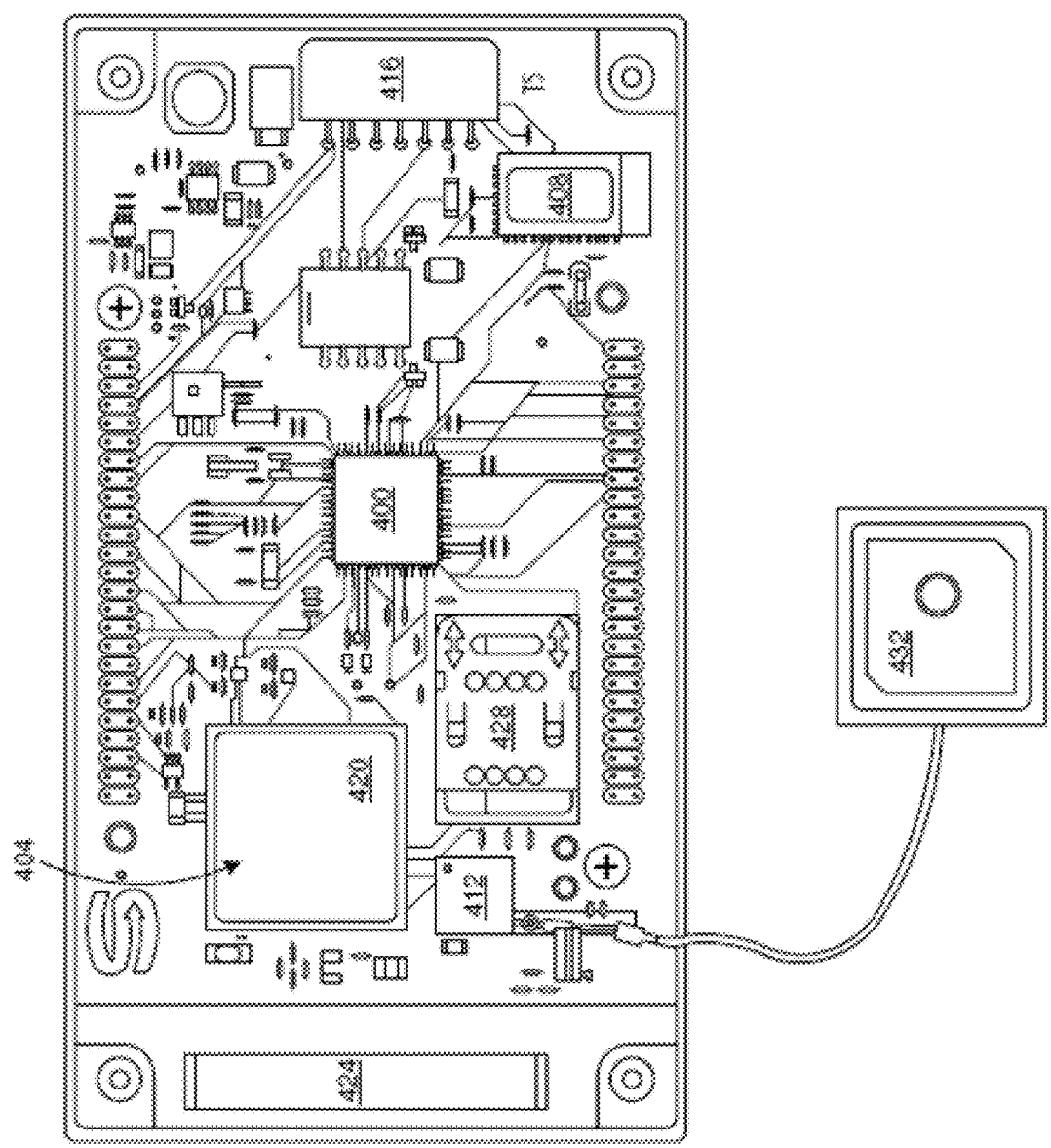
FIG. 7 depicts an embodiment of one of the present vehicle computing devices.

FIG. 7 depicts an embodiment of vehicle computing device 112*a*. In this embodiment, device 112*a* comprises a printed circuit board with a microcontroller 400 (including a processor and memory), a network communications transceiver 404, a local point-to-point communications transceiver 408, a global positioning system (GPS) module 412, and/or one or more physical ports or connectors 416. In the embodiment shown, microcontroller 400 includes a processor and memory from which the processor can execute instructions. Any of various commercially available microcontrollers may be used, such as, for example, a "TIVA" series microcontroller made by Texas Instruments. In this embodiment, network communications transceiver comprises a cellular (e.g., CDMA or GSM) modem 420 and corresponding cellular antenna 424 and SIM card holder 428. Any of various commercially available cellular modems may be used, such as, for example, cellular modules made by Telit Wireless Solutions. In some embodiments, device 112*a* further comprises a WiFi modem. In the embodiment shown, local point-to-point communications transceiver 408 is comprised in a Bluetooth Low Energy (BLE) module that includes a transceiver, microcontroller, and an integrated antenna. Any of various commercially available local point-to-point transceivers (e.g., as may be included in physically integrated communication modules) may be used, such as, for example, Bluetooth modules made by Anaren Inc. In the embodiment shown, GPS module 412 includes a receiver and microcontroller, and linked to a GPS antenna 432.

In the embodiment shown, ports 416 include at least a controller area network (CAN) bus port configured to receive one end of a cable that is configured connect to a CAN bus connector of a corresponding vehicle. In this embodiment, vehicle computing device is configured to interact with the CAN bus of a vehicle to which port 416 is connected to (i) send commands to the CAN bus to cause the vehicle to perform certain actions (e.g., lock/unlock doors, open trunk, chirp alarm, and/or the like), and/or (ii) retrieve characteristics of the vehicle (e.g., current ignition state, mileage or odometer reading, fuel level, and/or battery voltage). In some embodiments, the vehicle computing device (112*a*) is also configured to: in response to a triggering event, send to the server a message (e.g., an encrypted message) including one or more characteristics of the vehicle obtained from the CAN bus. In at least some embodiments, triggering events can include the passage of a predetermined period of time (e.g., 25 hours), receipt of a message (e.g., an unencrypted message, as described in more detail below with reference to FIG. 17) from the server, the vehicle leaving a preset geographic area, the vehicle traveling a distance in excess of a preset threshold, and/or others (e.g., as described below).

In at least some embodiments, the vehicle computing device is not configured to (e.g., and does not) communicate with the CAN bus via an on-board diagnostic (OBD) port of the corresponding vehicle. For example, in some embodiments, the vehicle computing device (112*a*) is configured to communicate with the CAN bus via a convenience module connector of an AUDI vehicle, such as, for example, an AUDI model A3, S3, Q3, A4, S4, A5, S5, Q5, SQ5, A6, S6, A7, S7, RS7, SQ7, A8, S8, R8, TT, and/or TTS. At least some vehicles (e.g., AUDI vehicles) are configured to detect whether a contact-free smartkey (a smartkey that need not be physically seated in a socket or in contact with the vehicle to enable operation of the vehicle, which may be referred to in some instances an "advanced key") is located in a cabin of the vehicle and, for vehicles that are so configured, the vehicle computing device can be configured to query the CAN bus of the vehicle to determine whether the smartkey located in the cabin (e.g., in response to receiving a command from the server and/or an authorized smartphone) and/or transmit (e.g., to the server and/or an authorized smartphone) an indication of whether the smartkey is located in the cabin. In systems configured with such smartkey-sensing functionality, the server can be configured to (i) transmit commands to one or more vehicle computing devices to determine whether a smartkey associated with the corresponding vehicle is located in the cabin; and/or (ii) receive signals from the one or more vehicle computing devices each indicative of whether the smartkey associated with the corresponding vehicle is located in the cabin.

Figure 8:
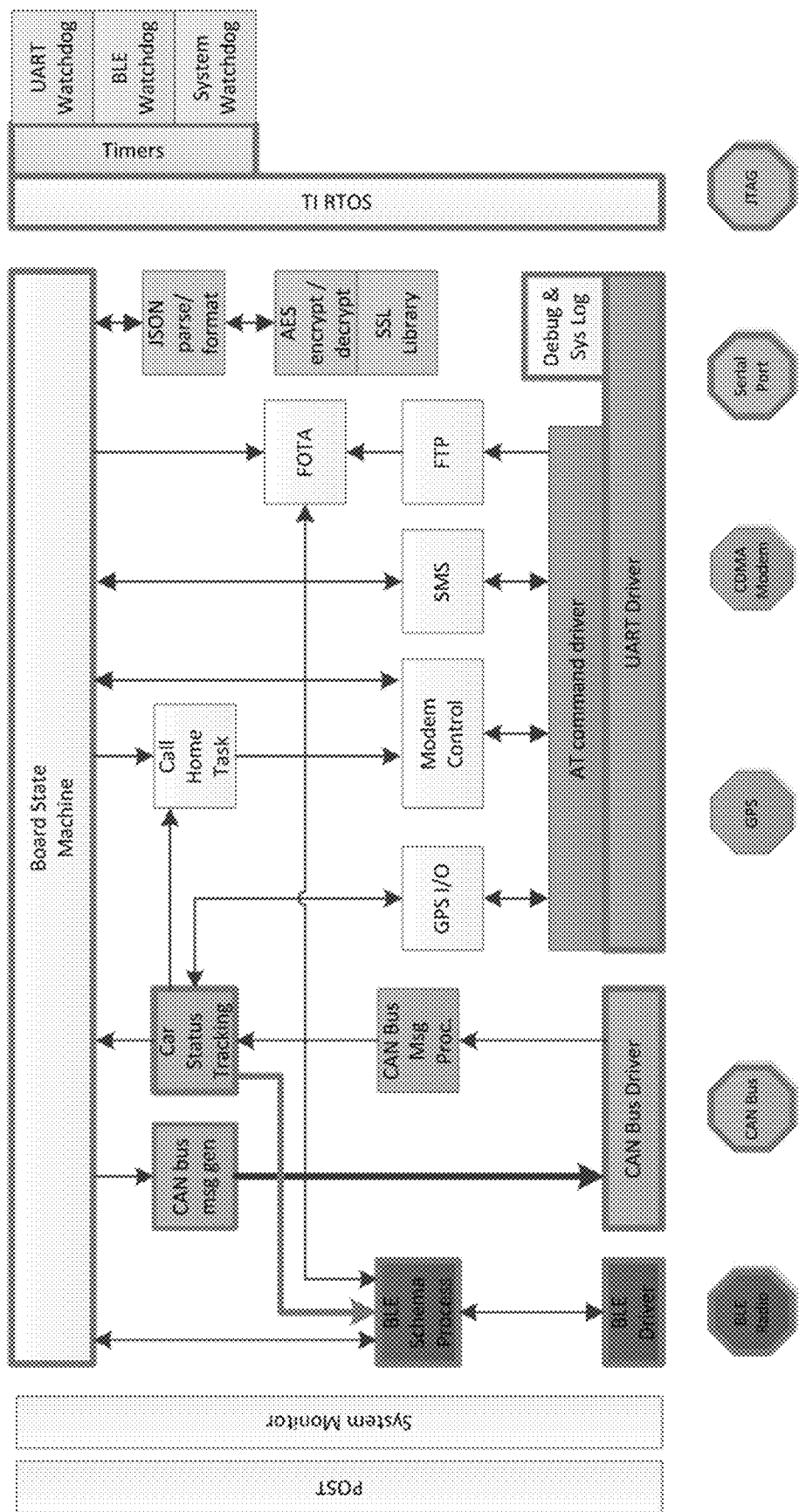
FIG. 8 depicts a schematic block diagram illustrating the functional components of one embodiment of firmware for the present vehicle computing devices, e.g., the one of FIG. 7.

FIG. 8 depicts a schematic block diagram illustrating the functional components of one embodiment of firmware for the present vehicle computing devices, such as, for example, device 112a as shown in FIG. 7.

Embodiments of the present systems, such as system 100 of FIG. 1, can be configured to include any combination of the features described in this disclosure, such as is described in more detail below. In many embodiments, server 104 comprises a portion of a reservation management (RM) system for a plurality of vehicles. For example, server 104 may be configured to interact with other servers, such as, for example, database servers configured to manage and serve read and/or write requests for one or more databases of the RM system, and/or parallel front-end servers that also (e.g., for load balancing and/or backup) interact with vehicle computing devices 112a and/or user portable computing devices 112b. As described above with reference to FIG. 3, servers (e.g., 104), vehicle computing devices (e.g., 112a), and portable computing devices (e.g., 112b) will each generally comprise memory (e.g., volatile and/or non-volatile) and a processor configured to execute instructions from the memory, which—unless otherwise indicated—is what is typically intended where this disclosure discusses a server, vehicle computing device, or portable computing device that is configured to perform a function. For example, that a server (e.g., 104) is configured to perform (or is described as performing) a function typically means that the server comprises memory and a processor configured to execute instructions from the memory to perform the function. Additionally, in the context of interactions between components (e.g., server 104 and a portable computing device 112a), a statement that one component is configured to transmit or send an item (signal, message, virtual key, and/or the like) to another component; also indicates that the other component is configured to receive the item, and vice versa. For example, a statement that the server is configured to receive from a user's portable computing device a request for access to a vehicle, also indicates that the user's portable computing device (e.g., application) is configured to send such a request. Especially in the context of a portable computing device (e.g., 112b), such instructions will typically be included in an application that is stored in the memory, as is common for smartphones and tablets such as may run various mobile operating systems (e.g., iOS, Android, and/or the like).

In many of the present embodiments, server 104 is configured to receive a request for access to a vehicle from a user's mobile computing device (e.g., smartphone) 112b via an application on the mobile computing device that is configured to interact with the RM system; and, in response (e.g., after validating the reservation) generate and send a virtual key to the user's smartphone, that the smartphone can then transmit to a vehicle computing device 112a to enable access to the corresponding vehicle. For example, a user with a reservation can activate an application on the user's smartphone 112b request to begin the reservation by gaining access to a vehicle, and the smartphone can transmit the request to the server.

As illustrated in FIG. 9, server 104 can be configured to, responsive to receiving (e.g., via cellular data network) a request for access to a vehicle at a step 900 (and, in some embodiments, also responsive to or conditioned on validating certain aspects of a reservation and/or the user's smartphone), generate and transmit a virtual key to the user's smartphone. In the depicted example, the vehicle computing devices (112a) each use a different encryption key for at least certain commands (e.g., at least some actions to be executed via the vehicles CAN bus) such that a command intended for a first vehicle and encrypted using a first encryption key corresponding to the first vehicle (a vehicle computing device 112a associated with the first vehicle) cannot be decrypted or executed by a different vehicle (e.g., any of the other vehicles). As such, the illustrated process proceeds to a step 904 at which the encryption key corresponding to a particular vehicle is retrieved from memory (e.g., by vehicle module 350) to enable encryption of a virtual key. In the illustrated example, server 104 and vehicle computing device 112a are both configured to use Advanced Encryption Standard (AES) encryption protocols as are known in the art. As such, a seed value is used to generate an initialization vector for use in encrypting the virtual key. In the example shown, a key timestamp such as a generation timestamp (e.g., indicating the time at which the request was received at step 900, or the time at which generation of the virtual key or a first one of multiple virtual keys began) is created at step 908 (e.g., by communications module 362). The generation timestamp may be created from a system clock, may correspond to a timestamp in the message that included the request for access, and/or may be created in various other ways.

In the illustrated example, the process then proceeds to a step 912 at which an initialization vector (IV) is generated (e.g., by communications module 362) from the encryption key retrieved in step 904 and the generation timestamp created in step 908. In such embodiments the server (104) and the vehicle computing devices (112a) of the system each has a common or shared algorithm used to generate the IV that is known to both of the server and the vehicle computing device. Such algorithms are known in the art, with one example including: (i) generating a hash digest of the seed value, and (ii) select the required string (e.g., 16 bytes) of data for the IV from the hash digest. Once the IV is generated, the process can proceed to step 916 at which data to be included in the virtual key is assembled and encrypted (e.g., by communications module 362), and may further be combined with unencrypted data to generate the virtual key. While this example includes AES encryption using a timestamp for the seed value, other embodiments may include different types of seed values and/or different types of encryption protocols.

In at least some embodiments, after generation of the virtual key at step 916, the virtual key corresponds to a specific vehicle, and includes an encrypted portion (e.g., up to the entire virtual key) that includes a command for an action to be initiated by a vehicle computing device (112a) of the specific vehicle. Examples of commands that may be suitable for and/or accessible to a customer user via the application on smartphone 112b users can include: start reservation, end reservation, unlock doors, and/or lock doors. Examples of commands that may be suitable for and/or accessible to an administrative user via an application on the administrative user's smartphone (e.g., via the same application as the customer user, but in which additional functionality is unlocked by the receipt of administrative credentials, or via a different administrative application) include: lock doors, unlock doors, change availability state, disable ignition, read fuel level, read battery voltage or charge level, and/or the like. Some such commands include multiple subparts. For example, a "start reservation" command may include subparts or subcommands for the vehicle computing device 112a to send messages to the CAN bus to cause the vehicle to unlock doors and open the trunk; an "end reservation" command may include subparts or subcommands for the vehicle computing device 112a to send messages to the CAN bus to cause the vehicle to determine whether a smartkey is present in the cabin of the vehicle and, if so, lock all doors of the vehicle. In addition to a command, the virtual key (e.g., the encrypted portion of the virtual key) can include additional pieces of information, such as, for example, a validation code (e.g., a reservation code that is unique to a particular reservation or usage period), a unique identifier (e.g., associated with a vehicle computing device for which the virtual key is intended), a session identifier (e.g. as described below), and/or the like, at least some of which are described in more detail below.

In embodiments in which each of the vehicles includes a unique encryption key, the encryption key retrieved at step 904 is unique to the specific vehicle (e.g., at least unique among the plurality of vehicles for which use is managed by the RM system) such that if the virtual key is inadvertently sent to an unintended vehicle, that unintended vehicle cannot decrypt the (encrypted portion of) virtual key or execute its command(s). In such embodiments, each vehicle computing device 112a stores its assigned unique encryption key in memory of the vehicle computing device (e.g., and does not store unique encryption keys of other vehicle computing devices such that each vehicle computing device is not capable of decrypting virtual keys intended for other vehicles).

In the illustrated example, the process next proceeds to a step 920 in which the virtual key (e.g., having at least an encrypted portion) is then transmitted (e.g., by communications module 362 of the server) to the user's smartphone 112b. In some embodiments, prior to be transmitted at step 920, a virtual key is bundled with other data, such as, for example, the generation timestamp (whether as an encrypted or unencrypted part of the virtual key or a separate string of data) and/or one or more additional virtual keys). For example, in some embodiments, the server is configured to generate and transmit two or more virtual keys (e.g., a "start reservation" virtual key, and an "end reservation" virtual key) for a single vehicle, or virtual keys for each of two or more vehicles (e.g., "start reservation" virtual keys for each of two or more vehicles, as described in more detail below.

FIG. 10 depicts a flowchart illustrating a process by which some embodiments of the present portable computing devices 112b (e.g., via an application on the portable computing device) identify and display available vehicles for selection by a user. By way of example, rental or shared-use vehicle lots often include multiple vehicles that are available for rent or use, and the present systems can be configured to permit a user to select a particular one of the available vehicles. In the embodiment shown, the process begins at a step 1000 when a user activates or provides input to an application (e.g., a graphical user interface initiated by utility module 378) on the user's smartphone 112b to request access to a vehicle for a reservation.

In the example shown, the process then proceeds to a step 1104 at which the application (e.g., utility module 378) validates the reservation. In some embodiments, validation is as simple as (1) determining whether the application has received confirmation of and/or other reservation information related to a reservation for (and/or within a predetermined window of) the current date and time (e.g., via vehicle management module 366), and/or (2) querying the server to determine whether the user has a reservation for (and/or within a predetermined window of) the current date and time (e.g., via utility module 378) and receiving responsive reservation information (e.g., a message confirming validation of the reservation and/or at least some details of a reservation sufficient for the smartphone to directly validate the reservation). In other embodiments, validation may also include verification of additional factors, such as, for example, current date and/or time relative to reservation date and/or time, user identification, credit card information and/or authorization, validity of user's driver's license, whether a pickup location of a reservation matches the current (and/or within a predetermined range of) the user's current location. If a reservation cannot be validated, the process terminates at 1008.

If a reservation is validated, the process can proceed to a step 1012 in which user's smartphone 112b (e.g., vehicle management module 366) scans for local vehicles, such as, for example, via a local point-to-point communication protocol (e.g., Bluetooth or Bluetooth Low Energy (BLE). For example, in some embodiments, vehicle computing devices 112a are configured to continuously or periodically broadcast an identification signal (e.g., at least when the car is available for use or rental) such that, when scanning for vehicles, the user's smartphone can detect any vehicles that are broadcasting the identification signal within communication range (as may be limited by characteristics of the transceivers of the smartphone and the vehicle computing device, and/or environmental conditions). In some embodiments, vehicle computing devices 112a are also configured to maintain a state record indicative of whether the vehicle is available to users, and transmit a current availability state with the identification signal, such that the identification signal received by user's smartphone 112b includes the availability state.

Once any vehicles within range have been identified, the process may proceed to an optional step 1016 in which vehicles identified in step 1012 are filtered for various characteristics (e.g., by vehicle management module 366). For example, in embodiments in which the server transmits one or more virtual keys to the user's smartphone 112b prior to step 1000, filtering at step 1012 can include determining whether the smartphone 112b has a virtual key for each identified vehicle (e.g., and discarding or noting in memory which vehicles the smartphone does not have virtual keys, so that such vehicles will not be displayed to the user or will each be displayed in a way that indicates the lack of a corresponding virtual key).

In this example, the process can then proceed to a step 1020 in which the smartphone (e.g., vehicle management module 366) determines whether any of the identified (e.g., as filtered) vehicles are available. While this is shown as a separate step, in some embodiments step 1020 is an integral part of step 1016 (e.g., availability is a characteristic used to filter). In alternate embodiments, the vehicle computing devices (112a) are configured to broadcast the identification signal only when in an available state, or to broadcast the identification signal in a designated way or mode only when in an available state, such that step 1020 is inherently included in step 1012 because only available vehicles are identified in step 1012. In this alternate embodiment, the information received by the smartphone inherently includes an indication of the state record of the corresponding vehicle due to the fact that it has been broadcast at all, or the fact that it has been broadcast in the designated way or mode. Once available vehicles are identified, the process can proceed to step 1024 in which, if one or more available vehicles have been identified, the available vehicles are displayed to a user; or, if no available vehicles have been identified, the process terminates at 1008 to allow the user to reposition relative to the vehicles and begin again at step 1000.

Figure 11:
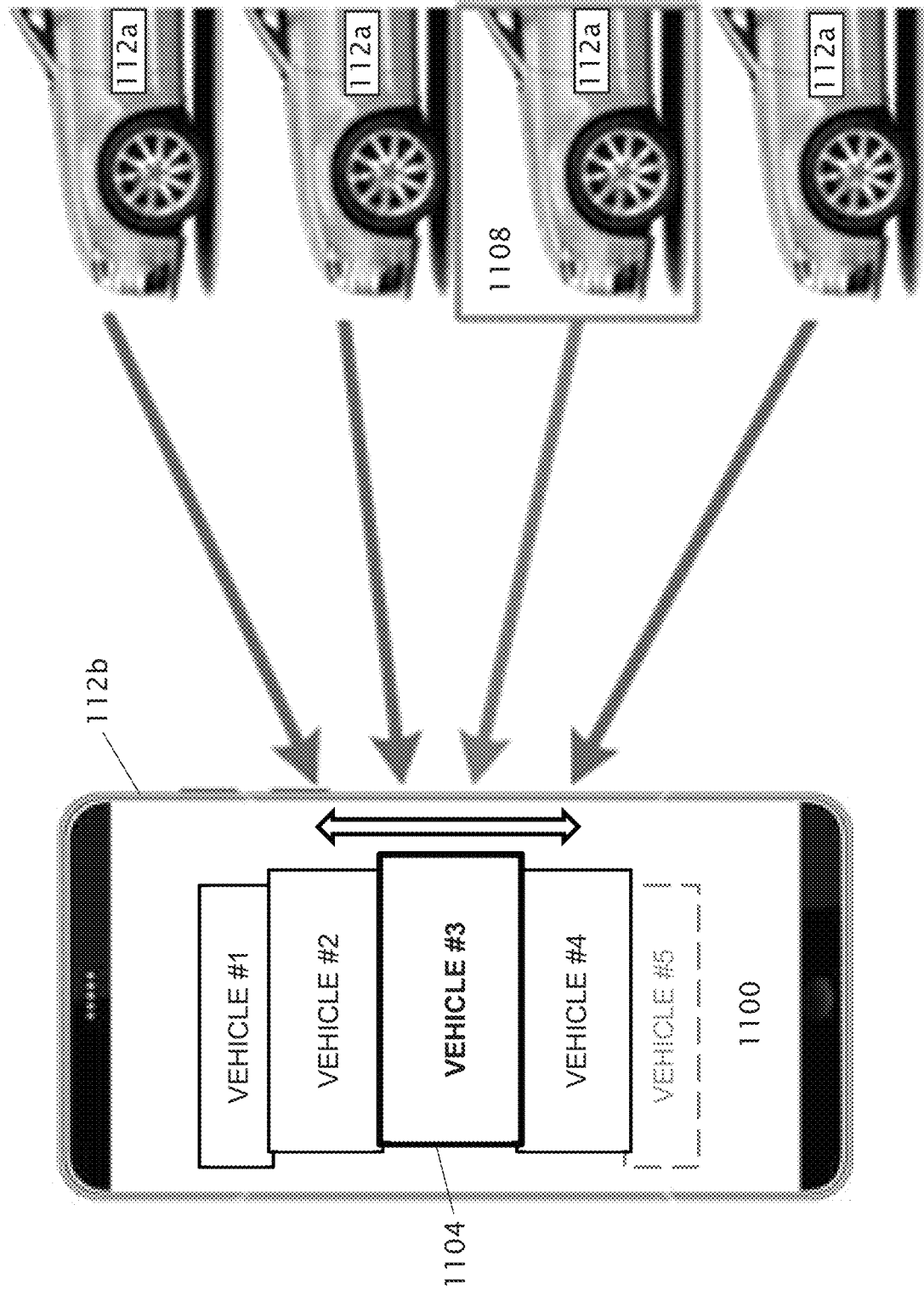
FIG. 11 depicts a schematic block diagram conceptually illustrating a user interface for displaying available vehicles for selection by a user.

FIG. 11 depicts a schematic block diagram conceptually illustrating a user interface 1100 for displaying available vehicles for selection by a user. As illustrated, the user's smartphone 112*b* may receive via local point-to-point communications identification signals from the vehicle computing devices 112*a* of each of multiple vehicles. When multiple vehicles are identified as available in steps 1012 and 1020, and are not filtered out in step 1016, each of the vehicles (e.g., indicia associated with each vehicle) can be displayed to the user via smartphone 112*b* (e.g., by vehicle management module 366) for selection. In the illustrated example, the vehicles are displayed via a graphic user interface 1100 that includes a carousel of images of license plates for each of the vehicles. In other embodiments, license plate numbers are displayed rather than images, and/or the indicia are presented as a static list rather than a carousel.

One the vehicles are displayed, the user can review the indicia (e.g., license plates, as shown in the depicted example) that are displayed on the smartphone, and input a selection 1104 (at step 1028 of FIG. 10) of a selected vehicle 1108 the user wishes to use or rent (e.g., a car near the user's current location). When only a single vehicle is available, or in other embodiments in which a user is provided one or more virtual keys for only a predetermined vehicle, the smartphone may display only indicia of that single vehicle without allowing the user to select from among multiple vehicles. Once a vehicle is selected, the smartphone is configured to proceed with either (1) sending to the server the request for access to the selected vehicle (which is received by the server at step 900 of FIG. 9); or, (2) if the smartphone has already received a "begin reservation" key for the selected vehicle, sending the "begin reservation" virtual key to the vehicle computing device 112*a* to the selected vehicle, such as, for example, the local point-to-point communication protocol, as described in more detail with reference to FIG. 12.

Figure 12:
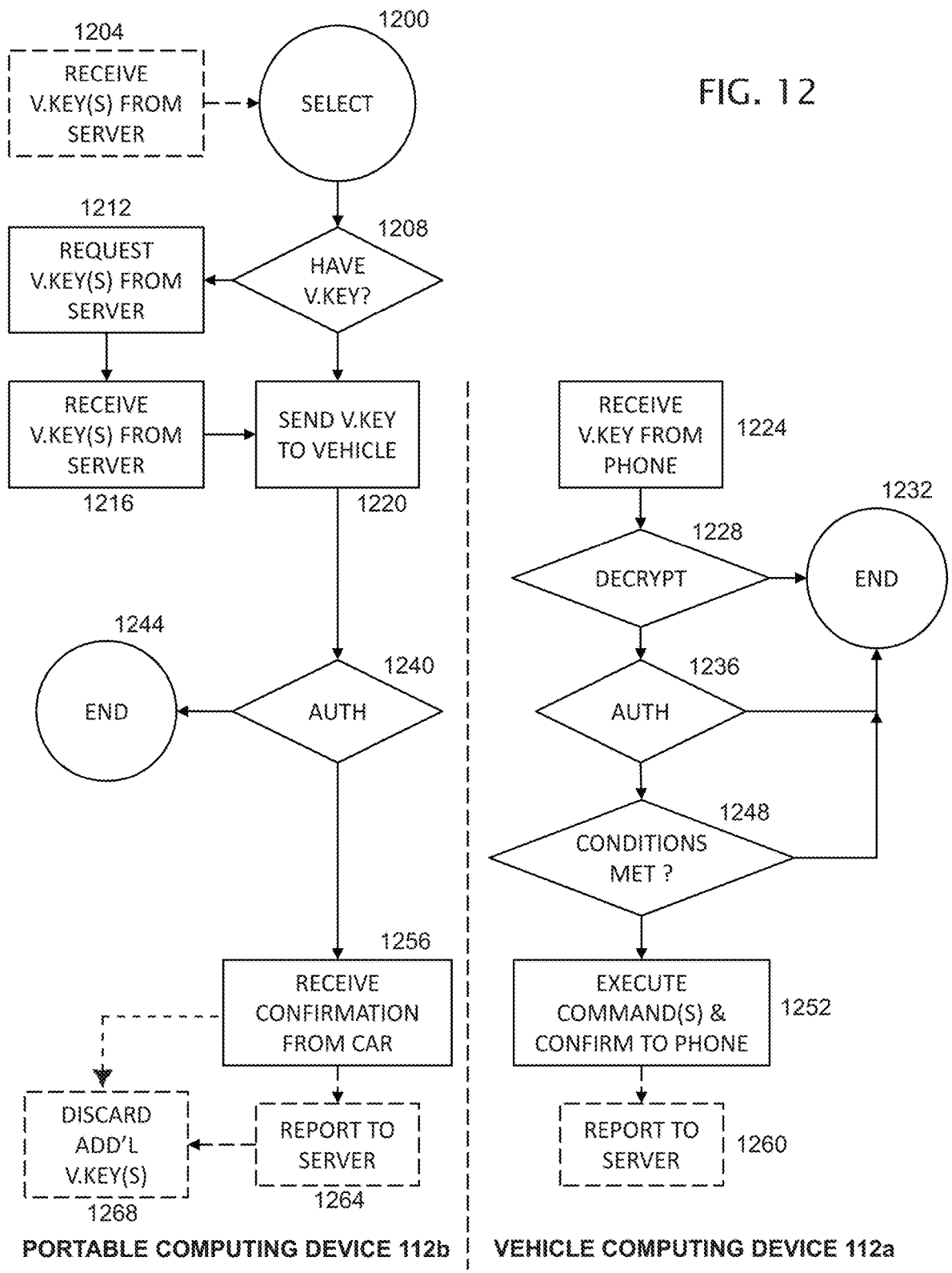
FIG. 12 depicts a flowchart illustrating a process by which some embodiments of the present portable computing devices and/or applications obtain and transmit virtual keys to the present vehicle computing devices, and by which some embodiments of the present vehicle computing devices receive and process virtual keys.

FIG. 12 depicts a flowchart illustrating a process by which portable computing device 112*b* (e.g., an application) can obtain and transmit virtual keys to vehicle computing devices, and by which vehicle computing device 112*a* can receive and process virtual keys. As shown, steps for each of the portable computing device (smartphone) and the vehicle computing device are shown. In the depicted example, the process begins at a step 1200 in which a vehicle is or has been selected (e.g., via vehicle management module 366). In configurations in which the system is configured to allow a user to select a particular vehicle (e.g., as described with reference to FIGS. 10 and 11), step 1200 may correspond to step 1028 (FIG. 10). In other configurations in which a specific vehicle is preselected for a user, step 1200 may include receiving information from the server identifying a particular vehicle. In either configuration, for embodiments in which one or more virtual keys are initially sent to the user's smartphone (e.g., before a user's selection of a specific vehicle, or before or simultaneously with server transmitting an information identifying a pre-selected specific vehicle for the user), the process includes an optional preliminary step 1204 in which the one or more virtual keys are received from the server. Step 1204 may correspond, for example, to the receipt of one or more virtual keys transmitted by the server at step 920 described with reference to FIG. 9.

In the depicted example, once a specific vehicle has been selected at step 1200, the process proceeds to a step 1204 at which smartphone 112*a* (e.g., via vehicle command module 370) determines a desired virtual key (e.g., a "start reservation" virtual key) has previously been received and is still stored on the smartphone. If not, the process can proceed to a step 1208 at which the smartphone transmits a request to the server for a virtual key. Where a reservation has not yet been started, step 1208 can include, for example, sending (e.g., via vehicle management module 366) information identifying the selected vehicle, such as is described for step 1028 with reference to FIG. 10. Alternatively, where information has previously been sent to or received from the server that identifies a selected vehicle, step 1208 can include, for example, sending (e.g., via command module 370) a request for a desired virtual key (e.g., a "start reservation" virtual key) corresponding to the selected vehicle. At least partially in response to receiving the request transmitted by the smartphone, the server can then generate and transmit one or more virtual keys (e.g., as described with reference to FIG. 9) to the smartphone, and the process can then proceed to a step 1216 at which the smartphone receives (e.g., via vehicle command module 370) the virtual key(s) transmitted by the server.

In this example, once the one or more virtual keys are received, the process proceeds to a step 1220 in which the user's smartphone sends (e.g., via vehicle command module 370) the virtual key to the vehicle computing device (112*b*) of the particular vehicle. Where multiple virtual keys are received by the user's smartphone at step 1216, step 1220 may, for example, including receiving user input selecting one of the virtual keys to be sent. For example, where "start reservation" and "end reservation" virtual keys are received, the smartphone can display indicia (e.g., text and/or images) that a user can select, and receive such a selection such as via input to the user interface (e.g., touchscreen) of the smartphone, to choose to send the "start reservation" virtual key. For illustration, the following describes the processing of one example of a "start reservation" virtual key, but is illustrative of at least some embodiments of the process for other types of virtual keys as well (e.g., except with respect to functions or commands to be performed by the vehicle computing device that are inherently specific to starting a reservation). In the example shown, the process then proceeds to a step 1224 at which the vehicle computing device (112*a*) of the vehicle receives the "start reservation" virtual key sent by the user's smartphone at step 1220. The process can then proceed to a step 1228 at which the vehicle computing device decrypts the received virtual key.

Figure 13:
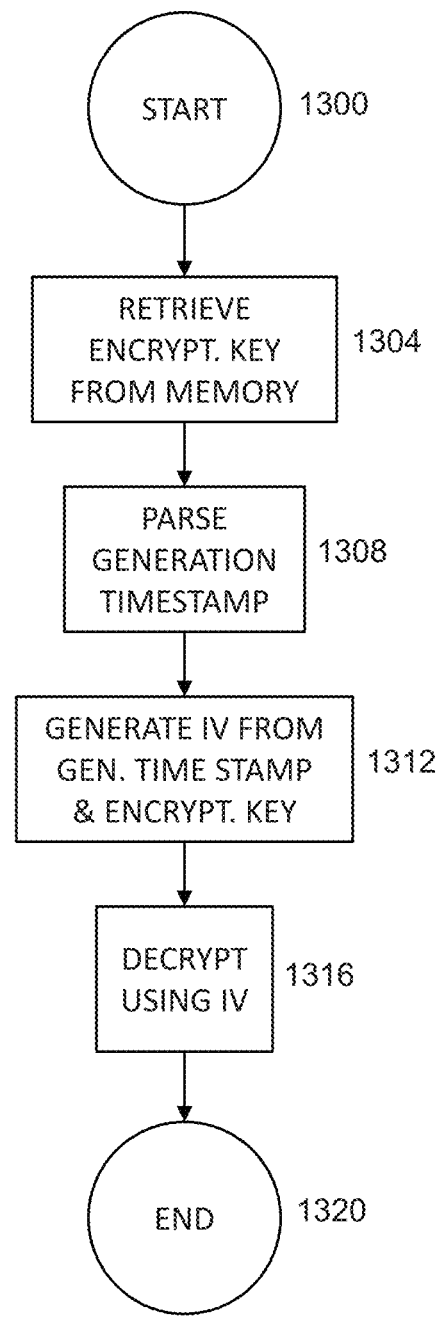
FIG. 13 depicts a flowchart illustrating a process by which some embodiments of the present vehicle computing devices decrypt virtual keys.

FIG. 13 depicts a flowchart illustrating a process by which vehicle computing device 112*a* can decrypt virtual keys (e.g., at step 1228 of FIG. 12). In the example shown, the decryption process begins at 1300 and proceeds to a step 1304 at which the vehicle computing device retrieves the encryption key from memory (e.g., nonvolatile memory), such as, for example, the unique encryption key that is unique to that vehicle, as described above. The process can then proceed to a step 1308 at which the seed value (e.g., generation timestamp, as described above), is identified. For example, in embodiments in which the virtual key includes an unencrypted portion with the seed value (e.g., the generation timestamp, as shown in FIG. 13 and described above), step 1308 involves identifying that seed value. Steps 1304 and 1308 may occur simultaneously and/or step 1308 may occur before step 1304. Once the generation timestamp (or other seed value) is identified and the encryption key retrieved, the process proceeds to a step 1312 in which the vehicle computing device implement the common or shared algorithm (as described above with reference to FIG. 9) to generate the initialization vector (IV) from the generation timestamp and the encryption key. Once the IV is generated, the process can proceed to a step 1316 in which the IV is used to decrypt the encrypted portion of the virtual key via the AES protocol, various implementations of which are known. Once the encrypted portion of the virtual key is decrypted, the process ends at 1320.

Returning to FIG. 12, if decryption of the virtual key (e.g., the encrypted portion of the virtual key) is unsuccessful (e.g., because a virtual key was sent to an unintended vehicle), the process ends at 1232. If instead the virtual key is successfully decrypted (e.g., via the process described with reference to FIG. 13), the process proceeds to a step 1236 in which the vehicle computing device (112*a*) initiates an authorization process, and a step 1240 in which the user's smartphone (e.g., security module 374) engages in the initiation process, to confirm that the virtual key originated from a smartphone of an authorized user (e.g., and/or an authorized version of an application on the user's smartphone).

Figure 14:
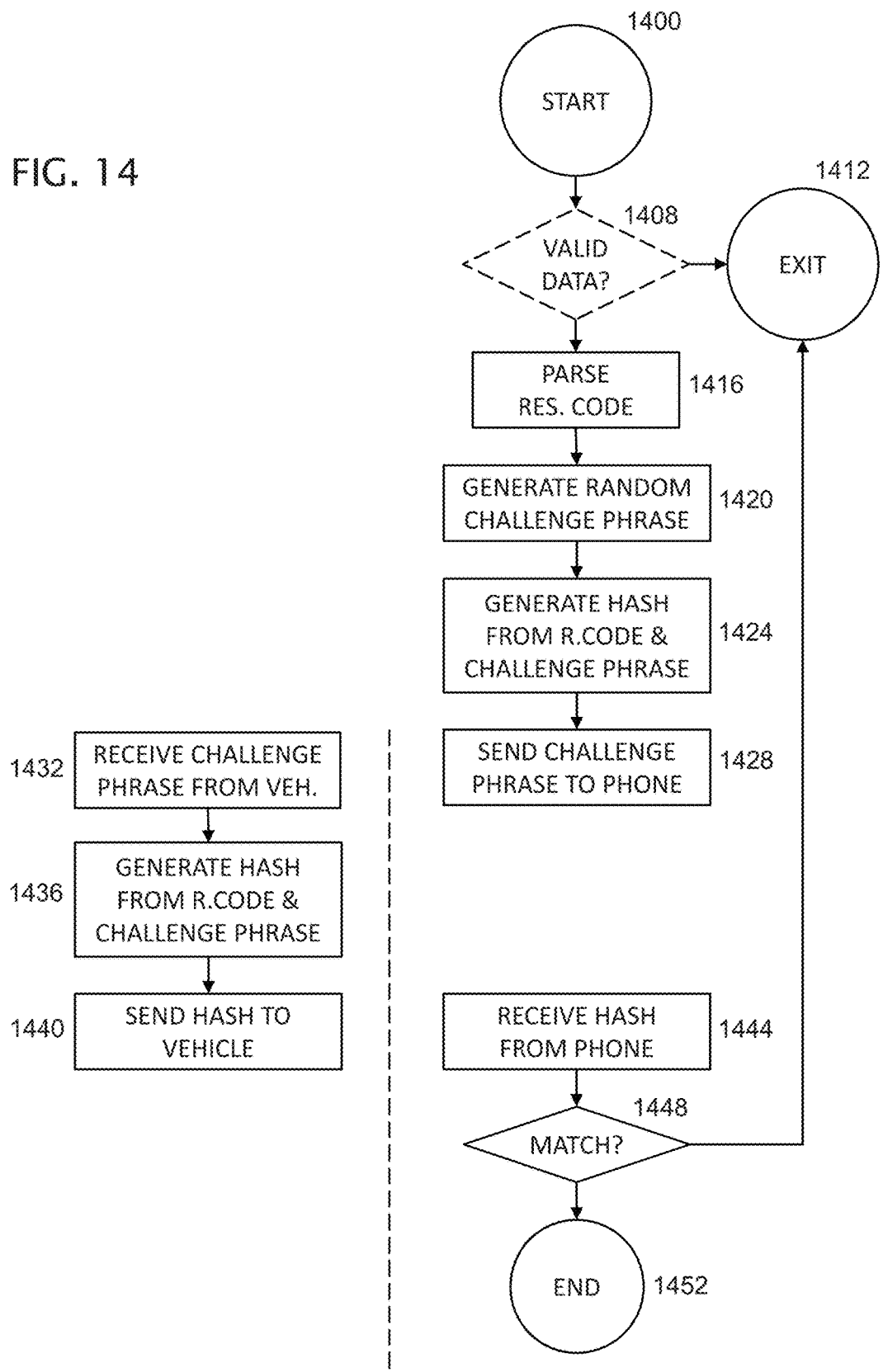
FIG. 14 depicts a flowchart illustrating a process by which some embodiments of the present vehicle computing devices and portable computing devices interact to verify that a virtual key sent to a vehicle computing device originates with an authorized portable computing device.

FIG. 14 depicts a flowchart illustrating a process by which the vehicle computing device (112*b*) and the smartphone (112*a*) (e.g., security module 374) interact to perform an authorization process (e.g., of steps 1236 and 1240 FIG. 12) to verify that a virtual key sent to the vehicle computing device originates with an authorized smartphone. In the example shown, the authorization process starts at 1400 and proceeds to an optional step 1404 at which the vehicle computing device determines whether the information in the decrypted virtual key is valid (e.g., includes all expected, or merely those required, data strings and/or the that the data strings or of the expected or required length). If the data cannot be validated, then the process terminates at 1408.

In some embodiments (such as the one shown), the authorization process relies upon (and the encrypted virtual key includes) a reservation identifier or code (e.g., including 6, 8, 10, 12, 14, or more digits). As such, if the data is validated at step 1408 (or if step 1408 is omitted), the process can proceed to a step 1416 at which the vehicle computing device parses the validation code (e.g., reservation) code from the decrypted data string(s) from the virtual key, after which the process can proceed to a step 1420 at which the vehicle computing device generates a random challenge phrase (e.g., data string). Such a challenge phrase can be generated from any of various sources and in any of various ways (e.g., selecting the first six digits of the time from the system clock) because the challenge phrase is used a seed or starting value. Steps 1416 and 1420 may occur simultaneously and/or step 1420 may occur before step 1416.

In the example shown, once the reservation code is parsed and a challenge phrase is generated, the process can proceed to a step 1424 at which a hash is generated from the challenge phrase and the reservation code. The hash is generated from a common or shared hash function that is known to both of the vehicle computing device and the smartphone. Any of various known hash functions may be used, so long as the same hash function is used by both devices. The process can then proceed to a step 1428 at which the vehicle computing device (112*a*) sends the challenge phrase to the smartphone (112*a*) from which the virtual key originated, and a step 1432 at which the smartphone receives the challenge phrase from the vehicle computing device.

In this example, once the smartphone receives the challenge phrase at step 1432, the process proceeds to a step 1436 at which the smartphone uses the common or shared hash function to generate (e.g., via security module 374) a hash from the challenge phrase and the reservation code. If the smartphone is authorized to have sent the virtual key to the vehicle computing device, then the smartphone will have also received, or will be authorized to retrieve, the reservation code from the server. For example, in at least some embodiments, the unique encryption key corresponding to the vehicle computing device is not (e.g., and is never) known to the smartphone, such that the smartphone is not capable of decrypting a virtual key that is received from the server and retransmitted to the vehicle computing device. In such embodiments, the server may therefore transmit to the smartphone the reservation code separately from virtual key. Once the smartphone has is generated at step 1436, the process can proceed to a step 1440 at which the smartphone sends the smartphone-generated hash to the vehicle computing device, and a step 1444 at which the vehicle computing device receives the smartphone-generated hash.

In the example shown, once the smartphone-generated hash is received by the vehicle computing device at step 1444, the process can proceed to a step 1448 at which the vehicle computing device compares the smartphone-generated hash to the hash generated by the vehicle computing device at step 1424. If the two hashes do not match, the process terminates at 1412. If the two hashes match, the process ends successfully at 1452 with the authorization having been successful, and therefore allowing the vehicle computing device to proceed with execution of commands in the virtual key. In some embodiments, ending the authorization process at 1452 includes storing a session identifier that can be compared to a later command (e.g., an "end reservation" command) to verify that a subsequent "end reservation" virtual key originates from the same user or smartphone that sent the "start reservation" command. In some embodiments, the reservation code is used as the session identifier; but other embodiments may instead use a different value, such as, for example, a unique identifier of the user's smartphone that is initially sent to the server and included in the encrypted portion of the virtual key.

Returning again to FIG. 12, if authorization is not successful at step 1236 and step 1240, the process on the vehicle computing device ends at 1232, and on the smartphone ends at 1244. If instead, authorization at step 1236 and step 1240 is successful, the process continues to a step 1248 at which the vehicle computing device (112*a*) determines whether any applicable conditions are satisfied for execution of the command(s) included in the virtual key. By way of illustration, in some embodiments, the encrypted portion of the virtual key includes an expiration timestamp defining the end of a time period by which the virtual key must be used, after which the command(s) in the virtual key will not be executed by the vehicle computing device. For example, for a vehicle reservation beginning Monday at 12:00 pm and ending Tuesday at 6:00 pm, the expiration timestamp in the "start reservation" virtual key may be Monday at 11:00 pm, and/or the expiration timestamp in an "end reservation" virtual key may be Tuesday at 6:00 pm, such that the user's smartphone must make at least a supplemental contact with the server to begin or end the reservation outside certain timed windows of the scheduled start and end times. In some embodiments, certain types of commands may be executed even if an expiration timestamp has expired; for example, an "end reservation" virtual key may, in some configurations, be executed even if the expiration timestamp has expired (e.g., as long as all other conditions for the "end reservation" virtual key are met).

As a second example, in some embodiments, the encrypted portion of the virtual key can include a unique identifier associated with an intended vehicle computing device and that unique identifier may be compared at step 1248 to the identifier of the vehicle computing device performing step 1248 to ensure a match. For this second example, it may be noted that in embodiments in which an encryption key unique to the vehicle computing device is required, successful decryption of a virtual key at step 1128 inherently indicates that the virtual key has been received by the vehicle computing device for which the virtual key was intended. However, even in such embodiments, the validation of a unique identifier associated with the vehicle computing device may be included as a secondary validation.

In addition to the examples discussed above, in some embodiments, certain commands or types of commands may be associated with conditions that must be satisfied at step 1248 before the command and any subcommands may be executed. For example, execution of a "start reservation" command may depend upon the vehicle having a current availability state of "available" or "staged" that indicates the vehicle has been serviced as needed between rentals or usage periods, and has not been taken by a different user. By way of further example, execution of an "end reservation" command may depend upon the vehicle having a current availability state of "rented" or "in use," a current ignition state of "off," all doors being locked, and/or (in vehicles that are configured to detect whether a smartkey is located in the cabin) that the smartkey is located in the cabin.

In the illustrated example, if all applicable conditions are not met, the process ends at 1232. If instead all applicable conditions are met at step 1248, the process can proceed to a step 1252 at which the vehicle computing device executes the command(s) and any associated subcommands (which subcommands may be included in the virtual key or may be stored in memory of the vehicle computing device for retrieval in connection with the execution of types of commands with which the subcommands are associated). For example, when executing a "start reservation" command, the vehicle computing device may perform all or some of the following actions and/or other actions: (i) unlocking one or more doors; (ii) opening the trunk; (iii) retrieving one or more characteristics of the vehicle (e.g., current ignition state, mileage or odometer reading, fuel level, vehicle location, and/or battery voltage), such as, for example, via the CAN bus, via the GPS module, or by retrieving from memory of the vehicle computing device values that were previously received from the CAN bus and/or the GPS module; and/or (iv) changing the availability of the vehicle state from "available" to "rented" or "in use." By way of further example, when executing an "end reservation" command, the vehicle computing device may perform all or some of the following actions and/or other actions: (i) retrieving one or more characteristics of the vehicle (e.g., current ignition state, mileage or odometer reading, fuel level, vehicle location, and/or battery voltage), such as, for example, via the CAN bus by retrieving from memory of the vehicle computing device values that were previously received from the CAN bus; and/or (ii) changing the availability of the vehicle state from to "rented" or "in use" to "returned" (e.g., indicating that the vehicle is ready to be serviced before being returned to an "available" state) or, in some instances, from "rented" or "in use" to "available."

In some embodiments, such as the one shown, step 1252 includes sending from the vehicle computing device to the smartphone a confirmation message indicating that the command(s) and any associated subcommands have been successfully executed. For example, successful execution of command(s) and any associated subcommands for a "start reservation" virtual key may include sending to the smartphone (e.g., via the local point-to-point communication transceiver of the vehicle computing device) a confirmation message indicating that the vehicle state has been changed to "rented" or "in use," and/or may include some or all of any retrieved characteristics of the vehicle. By way of further example, successful execution of commands and any associated subcommands for an "end reservation" virtual key may include sending (e.g., via the local point-to-point communication transceiver of the vehicle computing device) a confirmation message indicating that the vehicle state has been changed to "returned" or "available," and/or may include some or all of any retrieved characteristics of the vehicle. In such embodiments, the process can proceed to a step 1256 at which the smartphone receives the confirmation message sent by the vehicle computing device. In other embodiments, the confirmation message may instead be received from the server (e.g., after a report is sent from the vehicle computing device to the server, as described below).

Once the command(s) have been executed at step 1252, the process may proceed to an optional step 1260 at which vehicle computing device reports the execution of the command(s) to the server (e.g., via the cellular modem of the vehicle computing device), which report may include a message similar to the confirmation message that may be sent from the vehicle computing device to the smartphone. Additionally or alternatively, the process may proceed to a step 1264 in which the smartphone (e.g., utility module 378) reports the execution of the command(s) to the server (e.g., via the cellular modem of the vehicle computing device), which report may include a message similar to the confirmation message that may be sent from the vehicle computing device to the smartphone. In embodiments in which the process includes both of step 1260 and step 1264, the server may be configured to (e.g., for security and/or error-checking purposes) compare the information included in the reports received from the smartphone and the vehicle computing device, and/or may signal a user (e.g., an administrative user of the system) of an error condition and/or possible security breach if only one of the two reports is received.

In some embodiments, the process can also proceed to an optional step 1268 in which the smartphone (e.g., security module 374) deletes from the smartphone's memory a "start reservation" or an "end reservation" virtual key that has been successfully executed. By way of further example, in embodiments in which multiple virtual keys are transmitted to a user's smartphone prior to beginning a reservation, at step 1268 the smartphone (e.g., security module 374) may also delete unused virtual keys and/or virtual keys for vehicles other than the selected by the user (e.g., for which a "start reservation" virtual key has been sent and successfully executed).

While the above example of a process for transmitting a virtual key from the smartphone (112b) to the vehicle computing device (112a) is primarily described with reference to "start reservation" and "end reservation" virtual keys, in at least some of the present embodiments, the process—at least beginning with step 1208—is similar for any of various types of virtual keys (e.g., start reservation, end reservation, lock, unlock, and/or the like).

Figure 15:
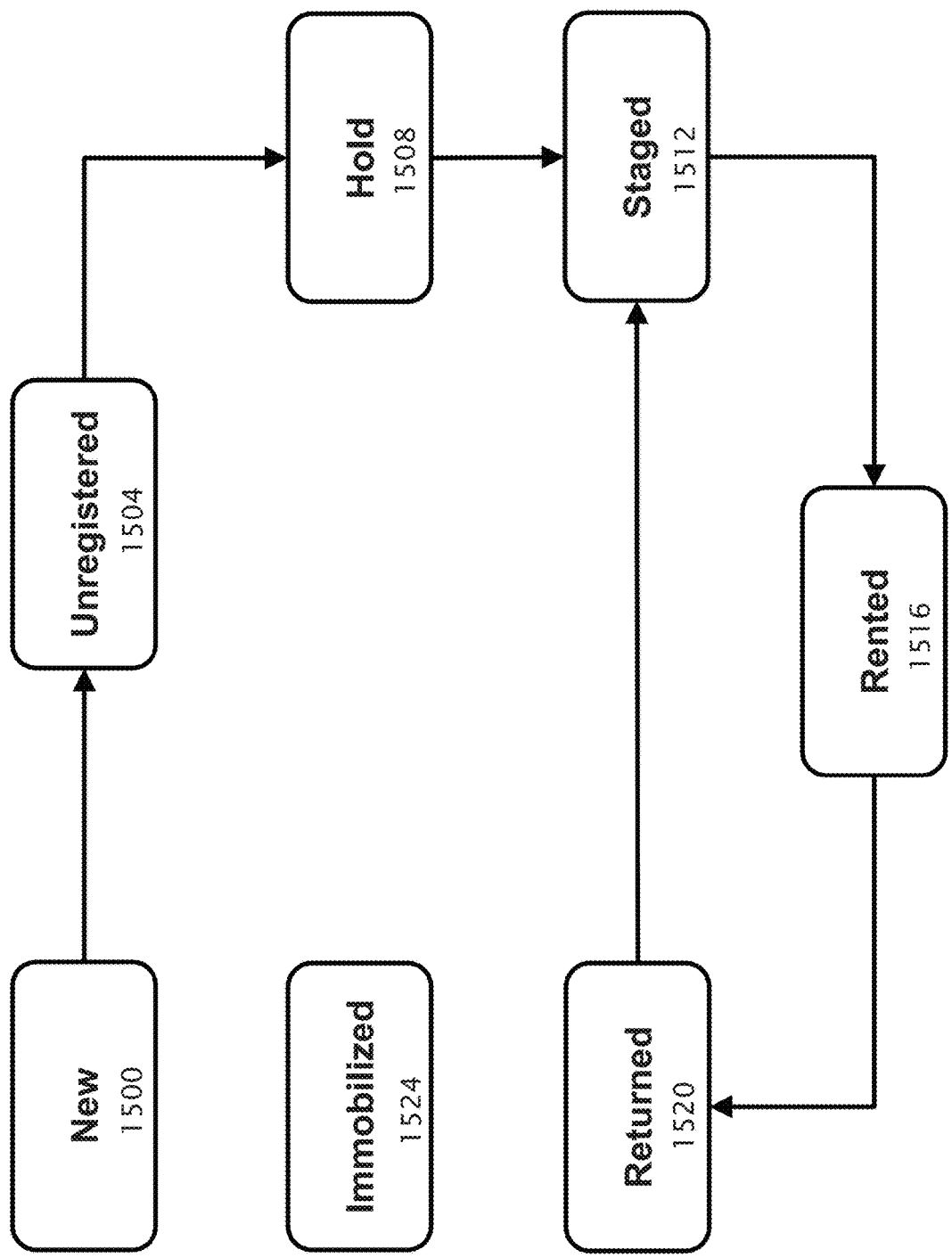
FIG. 15 depicts a flowchart illustrating various availability states of a vehicle and examples of typical transitions between the availability states.

FIG. 15 depicts a flowchart illustrating various availability states of a vehicle and examples of typical transitions between the availability states. In the example shown, a vehicle computing device 112a may have an initial availability state of "new," as indicated at 1500, prior to being associated with a particular vehicle. Once initiated in the system, and/or after being de-registered or unassociated with a particular vehicle, the availability state may be changed to "unregistered," as indicated at 1504. The availability state may be further changed from "unregistered" to "hold," as indicated at 1508, upon the vehicle being paired with a particular vehicle via a pairing process, such as, for example, the process described in more detail below with reference to FIGS. 16A-16B. From the "hold" availability state, once the vehicle has reached a desired location and/or is otherwise ready to be used, the vehicle computing device may change to a "staged" or "available" state, as indicated at 1512, such as, for example, in response to executing a "change state" virtual key, as described above. From this "staged" or "available" state, the vehicle computing device may change to a "rented" available state as indicated at 1516, such as, for example, in response to executing a "start reservation" or "change state" virtual key, as described above. From the "rented" or "in use" state, the vehicle computing device may change to a "returned" state as indicated at 1520, such as, for example, in response to executing an "end reservation" or "change state" virtual key, as described above. From the "returned" state, the vehicle computing device may return to the "staged" or "available" state indicated at 1512, such as, for example, in response to executing a "change state" virtual key (including a command to change the state of the vehicle) received from and sent by the server (104) or an administrative user's smartphone or other portable computing device 112*b* (e.g., running the application with administrative user authorization, or a distinct administrative version of the application).

Additionally, the vehicle computing device may change from the "returned" state to a "hold" state, as indicated at 1508, in response to executing a "change state" virtual key, as described above (e.g., when the vehicle needs maintenance or repairs in addition to more-typical services like cleaning or refueling). Further, the vehicle computing device may change from any of the other states to an "immobilized state" indicated at 1524, in response to executing a "change state" virtual key, as described above (e.g., in response to the system or an administrative user detecting fraud or theft related to the vehicle). In an "immobilized" state, for example, the vehicle computing device may trigger immobilization measures (e.g., interrupt power or other signal to prevent the vehicle from being started).

Figure 16B:
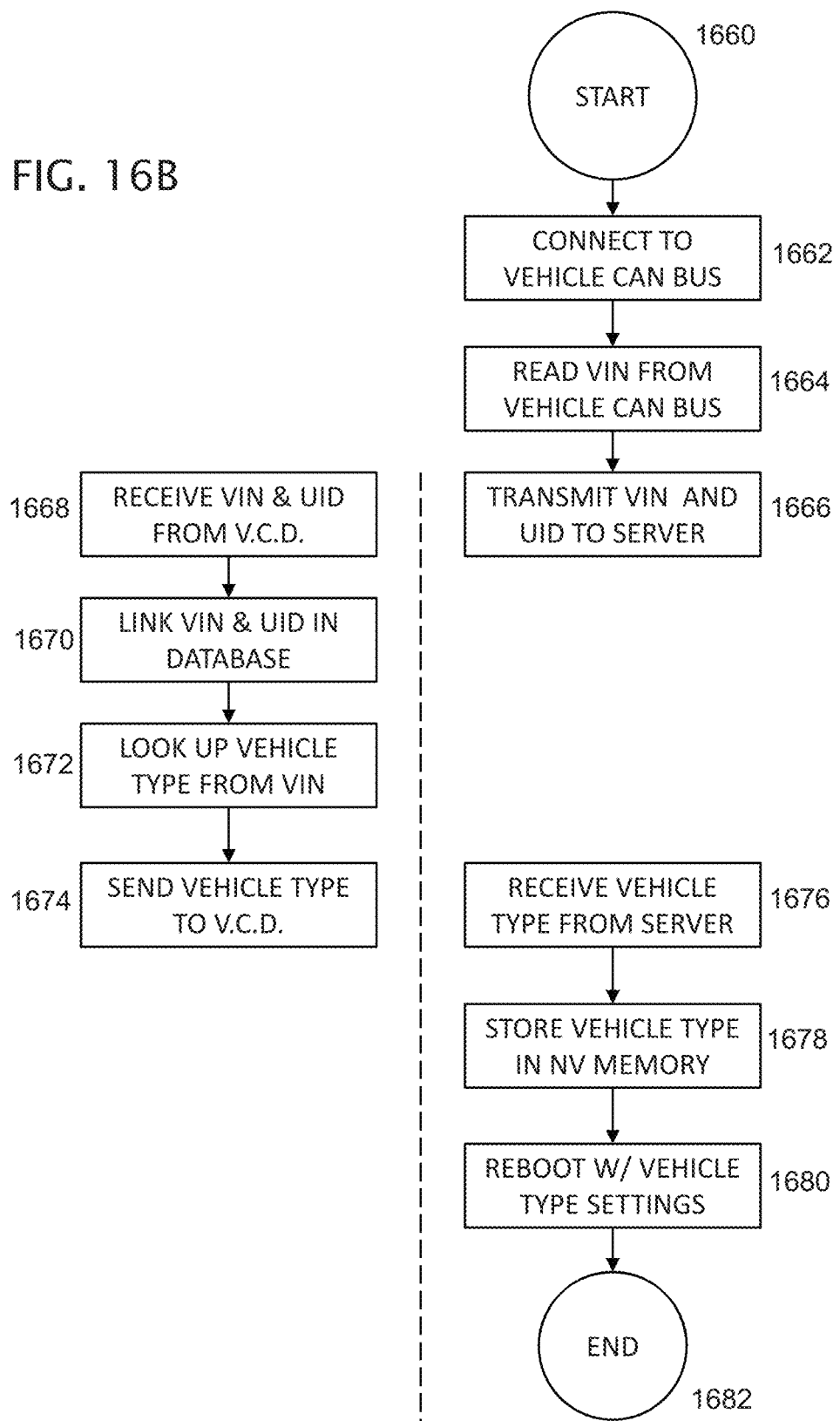

FIGS. 16A-16B depict flowcharts illustrating an example of a process by which a vehicle computing device (112*a*) can be prepared for pairing and then paired with a vehicle, and information associated with the pairing generated and stored in the server (104). More particularly, FIG. 16A shows an example of the present processes by which a vehicle computing device is loaded with firmware and a unique encryption key, and FIG. 16B shows and example of the present processes for pairing a vehicle computing device with a corresponding vehicle.

In the embodiment shown in FIG. 16A, the process begins at step 1600 and proceeds to a step 1604 at which a manufacturing work station (e.g., an access device 112 as described above with reference to FIG. 4) in communication with a vehicle computing device 112*b* is used to load firmware into the memory of the vehicle computing device (V.C.D.). In some embodiments, the firmware includes a plurality of vehicle types (e.g., models) and settings associated with each model to enable the vehicle computing device to function with any of the vehicle types for which settings are stored. The process can then proceed to a step 1608 at which the manufacturing work station requests from the vehicle computing device a unique identifier ("unique ID" or "UID") associated with the vehicle computing device. In response, at a step 1612, the vehicle computing reads the UID from its memory and, at a step 1616, sends the UID back to the manufacturing work station. At a step 1620, the manufacturing work station receives the UID from the vehicle computing device and, at a step 1624, sends the UID to server 104.

The process can then proceed to a step 1628 at which the server receives the UID and, at a step 1632, generates or otherwise assigns an encryption key for the vehicle computing device (e.g., a unique encryption key that is unique to that vehicle). For example, the encryption key may be or be generated from the UID or a portion of the UID, or a hashing function may be applied to the UID or a portion of the UID to generate an encryption key that is uniquely derived from the UID or portion of the UID. Once the encryption key is generated, the process can proceed to a step 1636 at which the UID (or portion of the UID) and the encryption key associated with the particular vehicle computing device are stored. The process can then proceed to a step 1640 at which the server generates and sends a message (e.g., which may be encrypted) that includes the encryption key to the manufacturing work station for storage in the vehicle computing device. The process can then proceed to a step 1644 at which the manufacturing work station receives the encryption key from the server, and a step 1648 at which the manufacturing work station sends the encryption key to the vehicle computing device. The vehicle computing device receives (and, if necessary, decrypts) the message with the unique encryption key and stores the encryption key in memory (e.g., nonvolatile memory) at step 1652, and the illustrated example of a provisioning process ends at a step 1656.

In the embodiment shown in FIG. 16B, the pairing process starts 1660 and proceeds to a step 1662 at which the vehicle computing device is connected to the vehicle CAN bus (e.g., a cable may be connected to both of port 416 and a convenience port of the vehicle, as described above). The process can then proceed to a step 1664 in which the vehicle computing device (e.g., vehicle management module 370) queries the CAN bus of the vehicle to determine a vehicle identification number (VIN) associated with the vehicle. The process can then proceed to a step 1666 at which the vehicle computing device (e.g., vehicle management module 370) sends a message (e.g., which may be encrypted) to the server with the VIN or at least a portion (e.g., the last 10 of 17 characters) of the VIN and the unique ID associated with the vehicle computing device, and a step 1668 at which the server receives the message with the VIN. The process can then proceed to a step 1770 at which the server links the VIN and UID in a database, a step 1672 at which the server uses the VIN to look up a vehicle type (or model) with which the VIN is associated, and a step 1674 at which the server sends a message with the vehicle type to the vehicle computing device. The process can then proceed to a step 1676 at which the vehicle computing device receives (and decrypts, if necessary) the message with the vehicle type, and a step 1678 at which the vehicle computing device stores and/or otherwise sets the vehicle type in its memory (e.g., nonvolatile memory). The process can then proceed to a step 1680 at which the vehicle computing device reboots itself and restarts with the settings associated with the set vehicle type.

FIG. 17 depicts a flowchart illustrating an example of a process by which the server(s) (104) can interact with vehicle computing devices (112*a*) to send command messages (e.g., virtual keys) to the vehicle computing device. In the embodiment shown, the process begins at step 1700, such as, for example, in response to a triggering event indicating that a command should be sent to a vehicle. One example of a triggering event would be a report from a user that a rented vehicle has been stolen, which would indicate that a "change state" command or virtual key should be sent to the vehicle to change its availability state to incapacitated to prevent the vehicle from being restarted after its engine is stopped. In this example, the process can proceed to a step 1704 at which the server generates a vehicle command (e.g., in the form of an appropriate "change state" virtual key in the manner described with reference to FIG. 9). The process can then proceed to a step 1708 at which the server (104) (e.g., communications module 362) sends a check-in prompt message (e.g., an unencrypted check-in prompt message) to the vehicle computing device, and a step 1712 at which the vehicle (e.g., vehicle command module) receives the check-in prompt message from the server. In some embodiments, the check-in prompt message is formatted as a simple SMS (short message service) message as is common for cellular text messages. In some embodiments, the content of the check-in prompt message are irrelevant to how the vehicle computing device responds to the check-in prompt message; for example, the vehicle computing device can be configured to check-in with the server in response to receiving any SMS message.

Once the check-in prompt message is received, the process proceeds to a step 1720 in which the vehicle computing device generates an encrypted check-in request message (e.g., via a process similar to the one described above with reference to FIG. 9). The process then proceeds to a step 1724 at which the vehicle computing device transmits the encrypted check-in request message to the server, and a step 1728 at which the server receives the encrypted check-in request message. Once the server receives the encrypted check-in request message from the server at step 1728, the process can proceed to a step 1732 at which the server decrypts the encrypted check-in request message (e.g., via a process similar to the one described above with reference to FIG. 13).

In some embodiments, the encrypted check-in request message generated by the vehicle computing device (112*a*) is formatted similar to at least some of the virtual keys described above (e.g., includes a command for the server to transmit any queued commands, and a key timestamp or other unique value, such as a generation timestamp, that the server can use to encrypt a command message or virtual key back to the vehicle). Once the check-in request message is decrypted at step 1732, the process can proceed to a step 1736 at which the server (104) encrypts a command message (e.g., virtual key) including the vehicle command(s) previously generated at step 1704. In some embodiments, the server uses the key timestamp or other unique value encrypted in the check-in request message to, in turn, encrypt the command message at step 1736. For example, the key timestamp or other unique value can be used with the unique encryption key to generate an initialization vector (IV) to encrypt the command message, and thereby further secure the command message or virtual key against falsification by hackers or other unwanted intrusions (e.g., without requiring a key timestamp to be sent as an unencrypted part of the command message). Once the command message is encrypted by the server at step 1736, the process can proceed to a step 1740 at which the server (e.g., communications module 362) sends the encrypted command message to the vehicle computing device, and a step 1744 at which the vehicle computing device receives the command message.

Once the command message is received by the vehicle computing device, the process can proceed to a step 1748, at which the vehicle computing device begins a decryption and execution sequence similar to the one starting at step 1228 of FIG. 12. For example, such a decryption and execution sequence would generally proceed according to steps 1228-1248 of FIG. 12, with the exception that step 1236 can be omitted. In this embodiment, the vehicle computing device can be configured to compare the received command message to the key timestamp or other unique value that was transmitted to the server in the check-in request message. For example, where the key timestamp is used with the unique encryption code to generate the IV, encryption itself indicates that the command message was valid. In some embodiments, the key timestamp or other unique value is also included in the encrypted portion of the command message and compared after decryption (e.g., at step 1248) to further ensure consistency. In embodiments of the present servers (104) and vehicle computing devices (112*a*) configured to implement a process of the type shown in FIG. 17, the vehicle computing device can be configured to not execute command messages received via the cell modem and/or seemingly sent by the server that are not responsive to a check-in request message sent to the server by the vehicle computing device (e.g., the vehicle computing device can be configured to take no action in response to unsolicited encrypted command messages).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:
1. A system comprising:
  a server comprising:
    a memory storing one or more instructions; and
    a processor coupled to the memory and configured to execute the one or more instructions to cause the processor to:
      receive, from a computing device of a transportation device, a check-in request message including an encrypted portion and an unencrypted portion including a reference identifier;
      encrypt a command message based on the reference identifier; and
      initiate transmission of the encrypted command message to the computing device in response to the received check-in request message.

2. The system of claim 1, where the encrypted portion of the check-in request message is encrypted based on the reference identifier.

3. The system of claim 1, where at least a portion of the encrypted command message is decryptable at the computing device based on the check-in request message.

4. The system of claim 1, where the processor is further configured to execute the one or more instructions to initiate transmission of a check-in prompt message to the computing device.

5. The system of claim 4, where the check-in request message is received responsive to the check-in prompt message.

6. The system of claim 4, where:
the server further comprises a cell modem configured to transmit the check-in prompt message to the computing device;
the check-in prompt message is not encrypted; and
the check-in prompt message has a short message service (SMS) message format.

7. The system of claim 1, where the processor is further configured to execute the one or more instructions to decrypt the encrypted portion of the check-in request message based on the reference identifier.

8. The system of claim 1, where the reference identifier comprises a key timestamp or a generation timestamp.

9. The system of claim 1, wherein the command message includes one or more commands to inhibit the transportation device from being started.

10. A method comprising:
receiving, at a server from a computing device of a transportation device, a check-in request message including an encrypted portion and an unencrypted portion including a reference identifier, the encrypted portion encrypted based on the reference identifier;
encrypting a command message based on the reference identifier; and
transmitting the encrypted command message to the computing device in response to the received check-in request message.

11. The method of claim 10, further comprising generating the command message based on a trigger event.

12. The method of claim 11, further comprising:
receiving a report that the transportation device is stolen; and
identifying the report as the trigger event.

13. The method of claim 10, further comprising:
accessing a key corresponding to the transportation device; and
generating a vector based on the key and the reference identifier.

14. The method of claim 13, where the command message is encrypted using the vector.

15. An apparatus comprising:
a computing device of a transportation device, the computing device comprising a memory including one or more instructions and a processor configured to execute the one or more instructions to:
initiate transmission, to a server, of a check-in request message including an encrypted portion and an unencrypted portion including a reference identifier;
receive an encrypted command message from the server, the encrypted command message including one or more commands for the computing device; and
decrypt at least a portion of the encrypted command message based on the check-in request message.

16. The apparatus of claim 15, where the processor is further configured to execute the one or more instructions to execute the one or more commands based on the encrypted command message being consistent with the reference identifier included in the check-in request message.

17. The apparatus of claim 15, where:
the processor is further configured to execute the one or more instructions to receive a check-in prompt message from the server; and
transmission of the check-in request message is initiated responsive to receipt of the check-in prompt message.

18. The apparatus of claim 15, where the processor is further configured to execute the one or more instructions to:
access a key;
generate a vector based on the key and the reference identifier, where decrypting the at least a portion of the encrypted command message includes decrypting the at least a portion of the encrypted command message based on the vector to generate at least a decrypted reference identifier; and
compare the decrypted reference identifier to the reference identifier.

19. The apparatus of claim 15, where the processor is further configured to execute the one or more instructions to:
determine whether one or more conditions are satisfied based on the decrypted portion of the encrypted command message and the check-in request message; and
determine that the encrypted command message is valid in response to a determination that the one or more conditions are satisfied.

20. The apparatus of claim 19, where:
the reference identifier comprises a key timestamp or a generation timestamp; and
the processor is further configured to execute the one or more instructions to:
determine whether the key timestamp or the generation timestamp is valid; and
determine whether the one or more conditions are satisfied further based on a determination that the key timestamp or the generation timestamp is valid.

* * * * *